United States Patent
Baratz et al.

(10) Patent No.: US 11,125,563 B2
(45) Date of Patent: Sep. 21, 2021

(54) SYSTEMS AND METHODS FOR AUTONOMOUS MACHINE TRACKING AND LOCALIZATION OF MOBILE OBJECTS

(71) Applicant: TG-17, LLC, Boston, MA (US)

(72) Inventors: Zcharia Baratz, Tel Aviv (IL); Ron Asher, Tel Aviv (IL); Joseph Keshet, Tel-Aviv (IL); Italy Fisher, Givatayim (IL)

(73) Assignee: TG-17, Inc., Boston, MA (US)

( * ) Notice: Subject to any disclaimer, the term of this patent is extended or adjusted under 35 U.S.C. 154(b) by 193 days.

(21) Appl. No.: 16/519,996

(22) Filed: Jul. 23, 2019

(65) Prior Publication Data

US 2020/0033128 A1    Jan. 30, 2020

Related U.S. Application Data

(60) Provisional application No. 62/702,489, filed on Jul. 24, 2018.

(51) Int. Cl.
| | |
|---|---|
| *G01C 21/16* | (2006.01) |
| *B64C 39/02* | (2006.01) |
| *G01C 21/20* | (2006.01) |

(52) U.S. Cl.
CPC ........... *G01C 21/165* (2013.01); *B64C 39/02* (2013.01); *G01C 21/20* (2013.01); *B64C 2201/145* (2013.01)

(58) Field of Classification Search
CPC .... G01C 21/165; G01C 21/20; G01C 21/005; G01C 21/206; G01C 21/26; G01C 21/28; B64C 39/02; B64C 2201/145
See application file for complete search history.

(56) References Cited

U.S. PATENT DOCUMENTS

| 8,718,838 B2* | 5/2014 | Kokkeby | .............. G01S 3/7864 |
| | | | 701/3 |
| 9,318,014 B1* | 4/2016 | Cheatham, III | ....... B64D 47/08 |
| | | (Continued) | |

FOREIGN PATENT DOCUMENTS

WO    2016/168722 A1    10/2016

OTHER PUBLICATIONS

Written Opinion of the International Preliminary Examining Authority in corresponding international application No. PCT/US2019/043076 dated Mar. 5, 2020.

(Continued)

*Primary Examiner* — Luis A Martinez Borrero
(74) *Attorney, Agent, or Firm* — Polsinelli, PC

(57) ABSTRACT

Disclosed are technologies for autonomous tracking. An initial coordinate of a beacon device carried by a user is registered as a dead reckoning waypoint with a drone configured to track the user. The drone receives IMU measurements from the beacon as the user moves. For each IMU measurement, a displacement vector characterizing user movement is calculated. Estimated beacon locations are calculated by dead reckoning, based on the displacement vectors and the dead reckoning waypoint. Later, an updated dead reckoning waypoint is calculated by obtaining the current location coordinate of the drone and performing optical triangulation to determine a relative position of the user with respect to the drone. The updated dead reckoning waypoint does not depend on previously estimated beacon locations, and accumulated IMU/estimation error is eliminated. Tracking continues, where subsequent estimated locations of the beacon are calculated by dead reckoning based on the updated dead reckoning waypoint.

47 Claims, 7 Drawing Sheets

(56) References Cited

U.S. PATENT DOCUMENTS

| | | | | |
|---|---|---|---|---|
| 9,977,434 | B2* | 5/2018 | Mellinger, III | H04W 4/023 |
| 10,341,984 | B2* | 7/2019 | Sogo | H04W 4/029 |
| 10,452,157 | B2* | 10/2019 | Lohbihler | G06F 17/18 |
| 10,996,768 | B2* | 5/2021 | Lohbihler | G06F 3/0346 |
| 2004/0179107 | A1* | 9/2004 | Benton | G01C 21/20 348/211.99 |
| 2009/0157233 | A1* | 6/2009 | Kokkeby | G01S 3/7864 701/3 |
| 2016/0205654 | A1* | 7/2016 | Robinson, Jr. | G01S 1/02 455/456.3 |
| 2017/0074678 | A1* | 3/2017 | Lo | B64D 43/02 |
| 2017/0300051 | A1* | 10/2017 | Zhou | B64C 25/32 |
| 2017/0371353 | A1* | 12/2017 | Millinger, III | G01S 5/0263 |
| 2018/0081027 | A1* | 3/2018 | Ben-Tzvi | G01S 3/781 |
| 2018/0107288 | A1* | 4/2018 | Lohbihler | G06F 17/18 |
| 2018/0158197 | A1* | 6/2018 | Dasgupta | G06K 9/726 |
| 2019/0104496 | A1* | 4/2019 | Sogo | G05D 1/0022 |
| 2019/0114798 | A1* | 4/2019 | Afrouzi | G01C 21/30 |
| 2019/0139422 | A1* | 5/2019 | Cheah | G01S 1/02 |
| 2019/0187297 | A1* | 6/2019 | Li | G01S 19/49 |
| 2019/0227576 | A1* | 7/2019 | High | G05D 1/12 |
| 2019/0325584 | A1* | 10/2019 | Peled | G05D 1/101 |
| 2020/0050287 | A1* | 2/2020 | Lohbihler | G06F 3/0325 |
| 2020/0309529 | A1* | 10/2020 | Lambert | G05D 1/0274 |
| 2020/0372238 | A1* | 11/2020 | Tajika | B64C 39/02 |
| 2021/0034078 | A1* | 2/2021 | Gomez Gutierrez | B64D 45/00 |
| 2021/0132233 | A1* | 5/2021 | Govindillam | B64D 47/08 |

OTHER PUBLICATIONS

International Preliminary Report on Patentability in corresponding international application No. PCT/US2019/043076 dated Aug. 31, 2020.

International Search Report and Written Opinion in corresponding international application No. PCt/US2019/043076 dated Oct. 14, 2019.

* cited by examiner

SYSTEMS AND METHODS FOR AUTONOMOUS MACHINE TRACKING AND LOCALIZATION OF MOBILE OBJECTS

CROSS-REFERENCE TO RELATED APPLICATIONS

This application claims the benefit of priority to U.S. Provisional Application No. 62/702,489 filed Jul. 24, 2018 and entitled "SYSTEMS AND METHODS FOR AUTONOMOUS MACHINE TRACKING AND LOCALIZATION OF MOBILE OBJECTS," the disclosure of which is herein incorporated by reference in its entirety.

TECHNICAL FIELD

The present disclosure pertains to object tracking, and more specifically to a system and method for tracking one or more moving objects with an autonomous machine.

BACKGROUND

While the problem of object tracking can appear deceptively simple on its surface, it in reality poses a complex challenge involving a plethora of different variables and environmental factors that must be accounted for. Conventional tracking systems are almost always limited to tracking only certain types of targets or targets with suitable characteristics, e.g. targets of a certain size, targets of a certain material composition, or targets having some other property to which the tracking system is attuned. Many recent efforts have focused on implementing computer or machine vision-based systems to computationally locate and track objects, with a goal of achieving a more robust range of targets and environments for which tracking can be performed.

In theory, these machine vision systems are fundamentally limited by the sensing resolution or resolving power of their vision sensors. In practice, however, these systems are limited by the enormous computational power required to detect certain types and classes of objects well before they are limited by their sensing resolution. Indeed, such systems struggle with real-time tracking of relatively small or fast moving objects and are plagued with high sensitivities to adverse environmental conditions, e.g. snow, fog, and other conditions of low light, low visibility, and/or low contrast.

Additionally, these conventional machine vision systems require maintaining line of sight (LOS) with the target or targets being tracked, which limits their utility in the likely event that LOS is lost with the target. This likelihood is exacerbated by the fact that conventional machine vision systems are often bulky and generally not portable if processing is performed locally, and if processing is performed remotely (e.g. in the cloud or at a remote server), conventional machine visions systems are often underpowered, subject to high latency, and vulnerable to network interruption. Accordingly, it would be desirable to provide a robust object tracking system that is portable, resistant to LOS losses, and compatible with an autonomous machine.

SUMMARY OF THE INVENTION

In one aspect of the present disclosure, there is provided an autonomous object tracking method for tracking a user with a drone configured to track the user, the method comprising: obtaining an initial location coordinate of a beacon device carried by the user, wherein the beacon device comprises at least an inertial measurement unit (IMU) and a wireless transceiver; registering the beacon device with the drone, wherein registering comprises storing the initial location coordinate of the beacon device as a dead reckoning waypoint for the beacon device; receiving, from the beacon device, a plurality of IMU measurements, wherein each given IMU measurement is measured over a given time step in which the beacon device is carried by the user; for each given IMU measurement of the plurality of IMU measurements, calculating an estimated location of the beacon device by: determining, from the given IMU measurement and its given time step, a displacement vector characterizing movement of the user over the given time step; and performing dead reckoning based at least in part on the displacement vector and the dead reckoning waypoint of the beacon device, such that the estimated location of the beacon device comprises a cumulative displacement from the dead reckoning waypoint of the beacon device; calculating an updated dead reckoning waypoint for the beacon device, where the updated dead reckoning waypoint does not depend on the previously estimated locations of the beacon device, by: obtaining a current location coordinate of the drone; performing optical triangulation to determine a relative position of the user with respect to the drone; and generating the updated dead reckoning waypoint for the beacon device based on the current location coordinate of the drone and the relative position of the user with respect to the drone.

In another aspect, performing optical triangulation to determine the relative position of the user with respect to the drone comprises: obtaining one or more frames of visual data captured by a camera disposed on the drone; analyzing the frames of visual data to identify a location of the user within a given frame, wherein detection frames are the given frames in which the location of the user is successfully identified; and extrapolating a three-dimensional spatial position of the user based on one or more calculated projection vectors from a sensor of the camera disposed on the drone to the identified locations of the user within the detection frames, wherein the projection vectors can be represented in Cartesian or polar coordinates.

In a further aspect, the current location coordinate of the drone is obtained for each detection frame, and for a given detection frame, the calculated projection vector is obtained by using the corresponding current location coordinate of the drone as the location of the sensor of the camera disposed on the drone; and the updated dead reckoning waypoint for the beacon device is calculated as the coordinates of the terminal point of the calculated projection vector.

In another aspect, the current location coordinate of the drone is determined by an optical flow system or a location sensor of the drone.

In a further aspect, optical triangulation is performed in response to one or more of: failing to receive a monitoring signal for a pre-determined amount of time; determining that an error or uncertainty associated with one or more of the estimated locations of the beacon device exceeds a pre-determined threshold; or receiving an indication that an optical analysis system of the drone has located the user in one or more frames of visual data captured by a camera disposed on the drone.

In a still further aspect, an onboard processor of the drone is used to calculate one or more of: the estimated locations of the beacon device, the displacement vector characterizing movement of the user over the given time step, the relative position of the user with respect to the drone, and the updated dead reckoning waypoint for the beacon device.

In another aspect, the drone comprises an unmanned aerial vehicle (UAV) or an unmanned aircraft system (UAS).

In a further aspect, the initial location of the beacon device is determined as being equal to an initial location of the drone.

In a still further aspect, the initial location of the beacon device is determined by applying a pre-determined offset to an initial location of the drone.

In another aspect, the beacon device comprises a mobile computing device carried by the user, and/or a mobile application installed on the mobile computing device carried by the user, such that the mobile application communicates with one or more sensors of the mobile computing device in order to obtain the plurality of IMU measurements.

In another aspect, the method further comprises updating a calculated path of the drone based on one or more of the estimated locations of the beacon device, wherein the calculated path causes the drone to follow the user according to one or more pre-determined parameters; and generating a projected path of the beacon device based at least in part on one or more velocity vectors calculated from the IMU measurements.

In a still further aspect, the method further comprises calculating correction values to minimize random errors and drift in the IMU measurements, the correction values based at least in part on one or more of the optical triangulation and the current location coordinate of the drone.

In another aspect, the correction values are calculated based at least in part on a difference between the estimated location of the beacon device as calculated by using the initial location coordinate of the beacon device as the dead reckoning waypoint, and an estimated location of the beacon device as calculated by using the updated dead reckoning waypoint, where both estimated locations of the beacon device are calculated at a same time step.

In a further aspect, the calculated path of the drone is updated to maintain one or more tracking parameters specifying a desired arrangement between the drone and one or more of the beacon device and the user.

In a still further aspect, the wireless transceiver of the beacon device comprises one or more of the following: a Bluetooth transceiver, a Bluetooth Low Energy transceiver, a WiFi transceiver, and a near-field transceiver.

In a further aspect, the initial location of the beacon device is determined based on one or more of a Global Positioning System (GPS) signal, a Global Navigation Satellite System (GLONASS) signal, and a Baidu signal.

In a second aspect of the present disclosure, there is provided an autonomous object tracking system for tracking a user with an autonomous drone, the system comprising: a beacon device configured to be carried the user, the beacon device comprising at least an inertial measurement unit (IMU) and a wireless transceiver; and a drone configured to autonomously track the user, the drone comprising: one or more processors; and at least one non-transitory medium having stored therein instructions which, when executed by the one or more processors cause the one or more processors to perform actions comprising: obtaining an initial location coordinate of the beacon device as carried by the user; registering the beacon device with the drone, wherein registering comprises storing the initial location coordinate of the beacon device as a dead reckoning waypoint for the beacon device; receiving, from the beacon device, a plurality of IMU measurements, wherein each given IMU measurement is measured over a given time step in which the beacon device is carried by the user; for each given IMU measurement of the plurality of IMU measurements, calculating an estimated location of the beacon device by: determining, from the given IMU measurement and its given time step, a displacement vector characterizing movement of the user over the given time step; and performing dead reckoning based at least in part on the displacement vector and the dead reckoning waypoint of the beacon device, such that the estimated location of the beacon device comprises a cumulative displacement from the dead reckoning waypoint of the beacon device; calculating an updated dead reckoning waypoint for the beacon device, where the updated dead reckoning waypoint does not depend on the previously estimated locations of the beacon device, by: obtaining a current location coordinate of the drone; performing optical triangulation to determine a relative position of the user with respect to the drone; and generating the updated dead reckoning waypoint for the beacon device based on the current location coordinate of the drone and the relative position of the user with respect to the drone.

In a third aspect of the present disclosure, there is provided an autonomous object tracking device configured to track a user, the device comprising: at least one processor; and at least one memory storing instructions, which when executed causes the at least one processor to perform actions comprising: obtaining an initial location coordinate of a beacon device carried by the user, wherein the beacon device comprises at least an inertial measurement unit (IMU) and a wireless transceiver; registering the beacon device with the tracking device, wherein registering comprises storing, in the at least one memory, the initial location coordinate of the beacon device as a dead reckoning waypoint for the beacon device; receiving, from the beacon device, a plurality of IMU measurements, wherein each given IMU measurement is measured over a given time step in which the beacon device is carried by the user; for each given IMU measurement of the plurality of IMU measurements, calculating an estimated location of the beacon device by: determining, from the given IMU measurement and its given time step, a displacement vector characterizing movement of the user over the given time step; and performing dead reckoning based at least in part on the displacement vector and the dead reckoning waypoint of the beacon device, such that the estimated location of the beacon device comprises a cumulative displacement from the dead reckoning waypoint of the beacon device; calculating an updated dead reckoning waypoint for the beacon device, where the updated dead reckoning waypoint does not depend on the previously estimated locations of the beacon device, by: obtaining a current location coordinate of the tracking device; performing optical triangulation to determine a relative position of the user with respect to the tracking device; and generating the updated dead reckoning waypoint for the beacon device based on the current location coordinate of the tracking device and the relative position of the user with respect to the tracking device.

In a fourth aspect of the present disclosure, there is provided an autonomous object tracking method, the method comprising: determining an initial location coordinate of a beacon device carried by a target object, the beacon device comprising at least an inertial measurement unit (IMU) and a wireless transceiver; registering the beacon device with a tracking device configured to track the target object, wherein registering comprises using the initial location coordinate of the beacon device to initialize an inertial navigation waypoint for the beacon device; receiving, from the beacon device, one or more first monitoring signals comprising first IMU measurements, the first IMU measurements corresponding to movements of the beacon device as carried by the target object; calculating one or more first estimated locations of the beacon device by using the first IMU measurements to determine a cumulative displacement from the inertial navigation waypoint of the beacon device; determining, based on a detected location of the target object, an updated inertial navigation waypoint for the beacon device by: performing optical triangulation to determine a relative position of the target object with respect to the tracking device; obtaining a current location coordinate of the tracking device; and calculating the updated inertial navigation waypoint for the beacon device based on the current location coordinate of the tracking device and the relative position of the target object with respect to the tracking device; receiving, from the beacon device, one or more second monitoring signals comprising second IMU measurements; and calculating one or more second estimated locations of the beacon device by using the second IMU measurements to determine a second cumulative displacement from the updated inertial navigation waypoint for the beacon device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
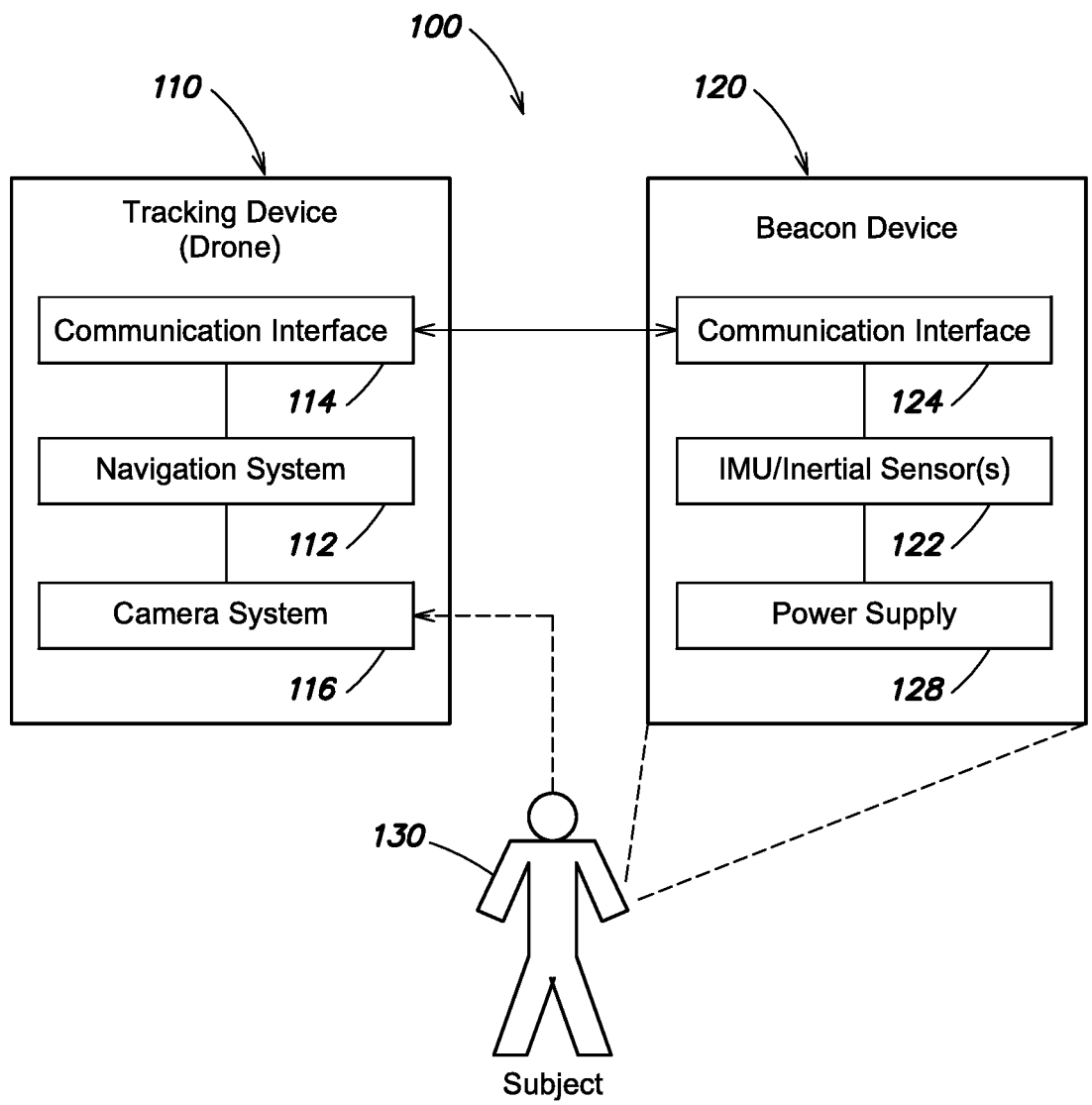
FIG. 1A depicts an example schematic diagram of a tracking device and beacon device according to one or more aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

SUMMARY/OVERVIEW

Disclosed are systems and methods for autonomous tracking and localization of moving objects and/or individuals (also referred to interchangeably as a "Subject" or "Subjects"). A beacon device (also referred to as a "beacon") is associated with a Subject and generates a series of wireless transmissions, one or more of which are received by a tracking device. In some embodiments, the tracking device can be a drone or other unmanned system configured to track a moving Subject, and the beacon device can be a mobile phone or other portable device carried by the Subject. After receiving one or more of the series of wireless transmissions from the beacon device, the tracking device performs autonomous tracking and localization of the Subject, wherein the autonomous tracking and localization is robust against line-of-sight (LOS) losses between the tracking device and the Subject. In some embodiments, the autonomous tracking and localization is also robust against measurement and sensor errors (such as drift and bias) that may accumulate over time, such as when the tracking device fails to receive or receives only intermittent wireless transmissions from the beacon device.

For example, the tracking device can augment the wireless transmissions received from the beacon device with supplementary tracking data. For example, supplementary tracking data can include, when available, spatial and/or location information of the Subject that is derived from sources/inputs that are independent of the beacon device/its wireless transmissions. Spatial information of the Subject can be computed (e.g., from a computer vision or optical flow system of the tracking device) and/or sensed (e.g., via a sensor or location system such as GPS (Global Positioning System), GLONASS (Global Navigation Satellite System), or Baidu, as well as by external devices and location systems that are not satellite based).

Example Autonomous Tracking and Localization System

FIG. 1A illustrates an example schematic diagram of an example autonomous tracking and localization system 100 of the present disclosure. This example tracking system can be employed to achieve a portable, low-power and long-range tracking system that, unlike conventional tracking systems, is robust to line of sight (LOS) losses.

Autonomous tracking and localization system 100 broadly comprises a tracking device 110 and a beacon device 120. For purposes of illustration, the following discussion makes reference to an example in which tracking device 110 comprises a drone (which is interchangeably referred to herein as "drone 110"), although it is appreciated that this is for purposes of illustration and is not intended to be limiting. For example, in some embodiments, tracking device 110 can be provided by an unmanned aerial vehicle (UAV), an unmanned aircraft system (UAS), and various other airborne tracking devices, apparatuses, platforms, machines, robots, etc., that can operate in an autonomous, semi-autonomous, remotely-controlled, or manually controlled fashion.

As illustrated, beacon 120 is associated with, carried by, attached to, or otherwise associated with a target to be tracked, which here is a specific individual/human Subject 130. In some embodiments, beacon 120 comprises a mobile phone, computer, or other portable device that is owned or used by Subject 130. In some embodiments, beacon 120 can be provided by a mobile application executing on the Subject's mobile phone, computer, or other portable device, as will be explained in greater detail below. Although the following description is made with respect to an example in which Subject 130 comprises a human, it is appreciated that Subject 130 may also comprise an animal (e.g., a pet or the like) or various other target objects, animate or inanimate, that are selected for tracking.

Tracking Device (Drone) 110

As illustrated in FIG. 1A, a drone 110 (i.e. the tracking device) comprises a navigation system 112, a wireless communication interface 114, and a camera system 116, although it is appreciated that this depiction is not intended to be limiting and is provided for purposes of clarity of illustration—various other drone components, systems, and sub-systems can be provided in drone 110 without departing from the scope of the present disclosure.

Navigation system 112 generates machine-readable commands to maneuver drone 110 (i.e., the tracking device) in a desired manner or cause drone 110 to perform a desired action. The navigation system 112 can be a primary or secondary navigation system of the drone, a flight controller of the drone, or a standalone component that may be integrated with drone 110 at the time of manufacture or may be coupled with drone 110 as an after-market component. In general, navigation system 112 is used to generate control commands causing drone 110 to track and localize Subject 130 in an autonomous or semi-autonomous fashion, as will be described in greater detail below. In some embodiments, navigation system 112 can be a supplemental navigation system designed to generate target tracking and localization commands that are transmitted to a primary navigation system of the drone for interpretation and updating of existing/currently executing flight plans and control parameters. Such primary and/or supplemental navigations systems as discussed herein can be local to the drone, remote from the drone, or some combination of both, as is desired.

A wireless communication interface 114 is communicatively coupled to navigation system 112. As contemplated in the present example tracking system 100, communication interface 114 comprises a Bluetooth module, which in some embodiments can be a Bluetooth Low Energy (BLE)-capable module, although other communication protocols, techniques and media can be employed without departing from the scope of the present disclosure. For example, wireless communication interface 114 (and the corresponding wireless communication interface 124 of beacon device 120) could be configured to provide a communicative link over one or more of WiFi, NFC, cellular data networks (including 3G, 4G, and/or 5G), and various other wireless communication media known in the art.

For example, supplementary tracking data can include, when available, spatial and/or location information of the Subject that is derived from sources/inputs that are independent of the beacon device/its wireless transmissions. Spatial information of the Subject can be computed (e.g., from a computer vision or optical flow system of the tracking device) and/or sensed (e.g., via a sensor or location system such as GPS (Global Positioning System), GLONASS (Global Navigation Satellite System), or Baidu, as well as by external devices and location systems that are not satellite based).

A camera system 116 is mounted on drone 110 and can be configured to include one or multiple cameras, having either overlapping or non-overlapping view angles. In some embodiments, additional or supplementary view angles and/or camera data can be captured from additional drones that are separate from but operate in conjunction or cooperation with drone 110. The onboard camera system 116 can be configured to capture image data, video data, or some combination of the two.

Beacon 120

Returning to FIG. 1A, beacon 120 includes an IMU (or other inertial sensors) 122, a wireless communication interface 124, and a power supply 128. In some embodiments, the wireless communication interface 124 can be similar or substantially identical to the wireless communication interface 114 of drone 110. Similarly, in the context of the present example tracking system 100, wireless communication interface 124 is capable of Bluetooth or BLE communication with recipients that include drone 110 or other tracking devices of the present disclosure. In some embodiments, one or more of the wireless communication interfaces 114,124 can be provided as a small chip or integrated circuit (IC), measuring approximately 7 mm×7 mm, and one or more of transceivers 116,126 can be provided by an omnidirectional antenna or a directional antenna.

Power supply 128 provides electrical power to the various components of beacon 120. Power supply 128 can be provided as a battery, which can be rechargeable or single-use, integrated or removable, etc., as desired, so long as power supply 128 is configured with a relatively small size for positioning within a housing of beacon 120. In some embodiments, power supply 128 can be a wireless power supply or a battery with a solar charging mechanism integrated into beacon 120.

Beacon 120 can be provided in a variety of physical designs or exterior forms such that it is compatible with attachment to or carrying by Subject 130. As mentioned previously, beacon 120 can be provided as a mobile application running on a mobile computing device or smartphone of Subject 130. Beacon 120 can also be provided as a purpose-built device, for example a ring, bracelet, or other wearable device that can be positioned on the body of Subject 130, or can be provided with an exterior mounting mechanism such as Velcro, a button snap, a latch, a zipper, a strap, a buckle, etc.

One or more inertial sensors 122 measure one or more of a position, orientation, rotation, or movement (velocity, acceleration, etc.) of beacon 120. These measurements can be instantaneous, or might be time averaged over some window (e.g., the previous half second, the previous 2 seconds, etc.). As illustrated in FIG. 1A, inertial sensor 122 is provided as an Inertial Measurement Unit (IMU), although it is also possible that inertial sensor 122 can comprise multiple discrete sensors that in combination achieve a same or similar functionality as an IMU, for example a GPS sensor to determine location; a gyroscope, magnetometer, or digital compass to determine orientation; and a velocity sensor or accelerometer to measure movement.

In some embodiments, inertial sensor 122 can comprise a full Inertial Navigation System (INS), given that the larger size of such an INS module is compatible with the physical design of beacon 120. The use of an INS and/or a GPS sensor in addition to or in lieu of an IMU can enhance the tracking accuracy and the tracking robustness of the present disclosure, although it is noted that the computational and/or power requirements for providing an INS or GPS sensor on beacon 120 can diminish the battery life of the beacon at an excessively fast rate, increase the cost of the beacon, or increase the size of the physical beacon device itself, all of which may be undesirable in light of the need for beacon 120 to be carried by or attached to Subject 130. However, it is contemplated that beacon 120 can generally rely upon the IMU/inertial sensor(s) 122 and operate without a local INS or GPS sensor. In some embodiments, an INS and/or GPS sensor can be provided at a location remote from beacon 120, such as on drone 110, and used to supplement IMU data received from the inertial sensors of beacon 120.

Wireless transmissions from beacon 120 include inertial data measured by IMU 122, and this inertial data can then be used as a primary source of information for drone 110 to perform autonomous tracking and localization. For example, drone 110 can utilize the inertial data to perform dead-reckoning and estimate the location of beacon 120 (and by extension, an inferred location of Subject 130, who is carrying or otherwise associated with beacon 120) in substantially real-time.

The inertial data generally contains a time-series of acceleration values that are measured by IMU 122 and correspond to the motion of beacon 120 (and by extension, correspond to the motion of Subject 130 who is carrying beacon 120). For example, consider a scenario in which a three-dimensional Cartesian coordinate system is used, i.e. with an x, y, and z-axis. The received inertial data for a given time step t can be given by $IMU_t = a(t) = \{a_x(t), a_y(t), a_z(t)\}$, where a(t) represents the acceleration vector. More generally, it is contemplated that the measured acceleration values contained in $IMU_t$ correspond to the axes of the coordinate system being used. In some embodiments, the inertial data can contain rotation and/or orientation/heading information of beacon 120 in addition to the acceleration values, although it is also possible to derive one or more of the rotation information and the heading information from the acceleration values.

Trajectory Projection

Figure 2:
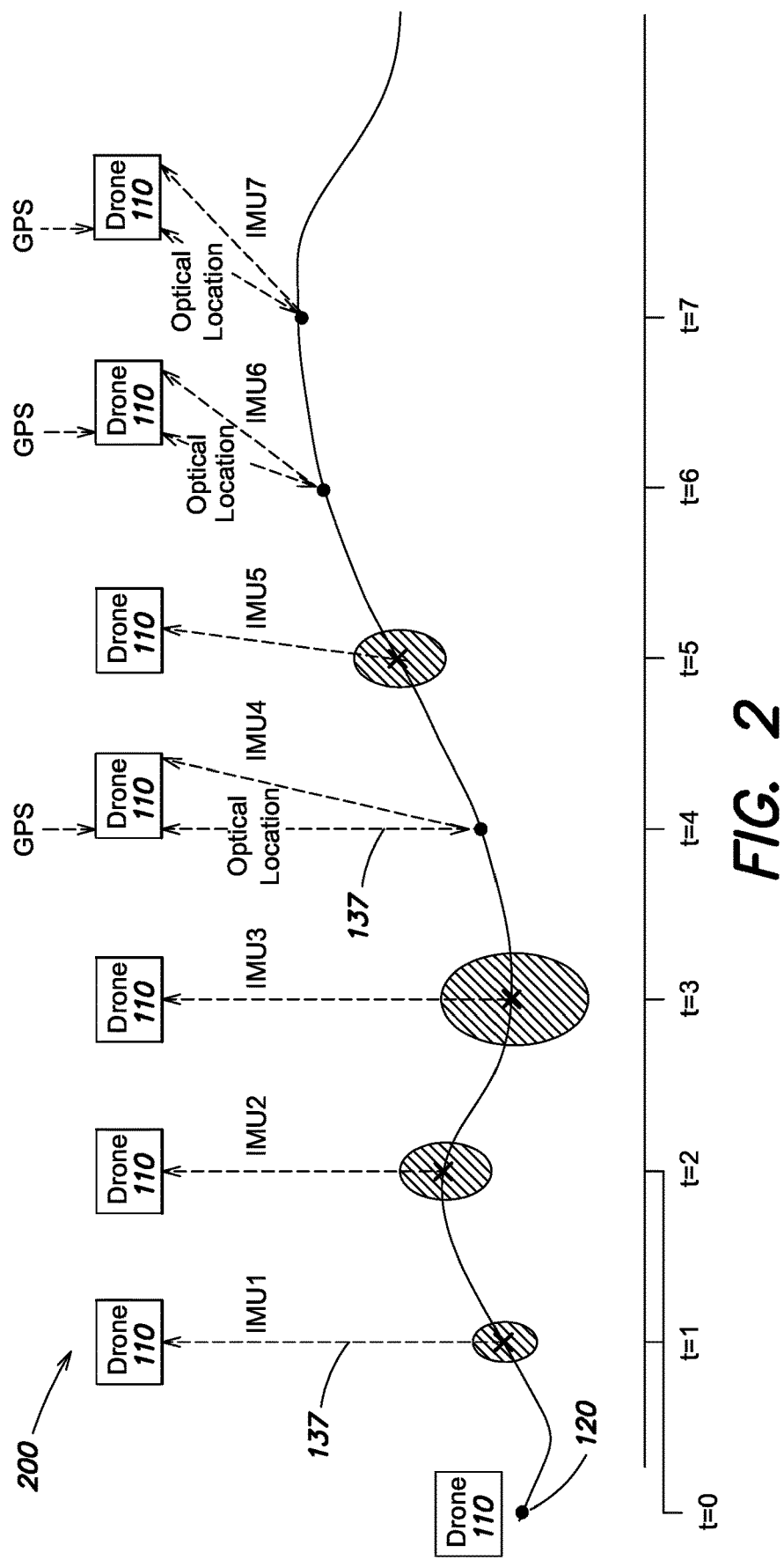
FIG. 2 depicts an example process flow of several time steps of target tracking and localization according to aspects of the present disclosure.

FIG. 2 depicts an example process diagram 200 as drone 110 performs autonomous tracking and localization of beacon 120 and Subject 130 over several example time steps. A time scale is provided along the horizontal axis. The trajectory of beacon 120 is represented by the solid black line above the horizontal time scale. Tracking waypoints (such as the initial "fix" coordinate and any intermediate reference coordinates of beacon 120) are depicted as solid black dots, and are used to represent beacon locations that are known with high confidence and/or used as a ground truth value by drone 110 and/or the trajectory prediction function described below. Estimated waypoints (which are output by the trajectory prediction function) are represented by an "x", and the surrounding shaded area represents the error/uncertainty associated with a given estimated waypoint. It is noted that the error/uncertainty is exaggerated in both size and rate of accumulation, for purposes of clarity of illustration and explanation.

At a first time step t=0, Subject 130 launches or deploys drone 110 into the environment or area immediately surrounding the Subject. Drone 110 determines or otherwise obtains its initial location, $Drone_0$, as part of the deployment process. In some embodiments, the drone's initial location can be queried from a navigational system or flight controller of the drone, e.g. which utilizes a position sensor (GPS, GLONASS, Baidu, etc.) to determine the drone's initial location with a high degree of accuracy. In some embodiments, drone 110 can obtain its initial location using, for example an optical flow system or other localization system or device (particularly those suitable for use indoors or in other areas where GPS and other positioning satellite signals are unable to reach).

Beacon 120 and/or Subject 130 are registered with drone 110, the registration indicating that beacon 120 will be carried on or near Subject 130. As discussed previously, beacon 120 can be an application running in the background of a mobile phone belonging to the Subject, can be a wearable device, or can be a dedicated piece of attachable hardware.

Beacon 120 is registered with drone 110 (or some other assigned tracking device). In some embodiments, this registration might include information of Subject 130, or information of an offset between Subject 130 and beacon 120. In some embodiments, registration can include beacon 120 and drone 110 agreeing upon transmission protocols for the monitoring information, e.g. the communication network or frequency to be used, encryption keys to be used, a periodicity of measurement and transmission to be used, etc. These registration parameters can be negotiated by beacon 120 and drone 110, input by a human (Subject 130) into an associated application or directly into one of beacon 120 and drone 110, or unilaterally determined by beacon 120 or drone 110.

Recalling that Subject 130 is also associated with or carrying beacon 120 (e.g. the beacon might be provided by the Subject's mobile phone), the initial beacon location is set equal to the initial drone location: $Beacon_0 = Drone_0$. This is because if the Subject himself launches the drone, it can be assumed that the drone and the beacon have substantially the same location. As mentioned previously, the initial beacon location and the initial drone location can be represented by three-dimensional coordinates in a Cartesian coordinate system, although other coordinate systems and representations may also be employed without departing from the scope of the present disclosure. In some embodiments, it is possible to calculate, measure or otherwise determine an offset between the drone and the beacon, and apply this offset to generate a more accurate initial beacon location from the initial drone location, such that $Beacon_0 = Drone_0 +$ Offset. For example, the offset can be sensed or measured by drone 110 and/or beacon 120, or can be input by Subject 130, e.g. into the same mobile application that turns the Subject's mobile phone into beacon 120.

Drone 110 stores the initial beacon location as a navigational fix coordinate, or fixed waypoint that can be used as an input to a trajectory prediction function that generates estimated beacon locations for future times steps t>0. In some embodiments, the trajectory prediction function can perform dead-reckoning or other inertial navigation computations as would be appreciated by one of ordinary skill in the art. Because tracking has not yet begun at time step t=0, there is not yet any accumulated error associated with the tracking waypoint $Beacon_0$.

Between time steps t=0 and t=1, Subject 130 moves through the environment and beacon 120 measures IMU and/or inertial data $IMU_1$ corresponding to these movements. With tracking initiated, beacon 120 then wirelessly transmits inertial data from IMU 122 to the drone 110 by packaging the inertial data as a monitoring signal 137. Beacon 120 can transmit monitoring signal 137 periodically or at a fixed interval of time steps, which, if the time step is sufficiently small, can function as a continuous transmission of monitoring signal 137, i.e. the streaming of inertial data as it is received from IMU 122. Beacon 120 may also transmit monitoring signal 137 when an appropriate threshold or magnitude of change in one or more of the values measured by IMU 122 is detected, e.g., greater than a 1% change. In some embodiments, the transmission pattern or schedule of beacon 120 can depend at least in part on a current state of charge supplied from power supply 128, with more frequent transmission associated with a greater state of charge and less frequent transmission associated with a diminished state of charge. The monitoring signal can be generated and transmitted according to one or more of the registration parameters established previously. For example, the monitoring signal can be generated and transmitted at a set interval (every 1 second, every 5 seconds, etc.), can be generated and transmitted in response to detecting movement, or can be generated and transmitted in response to detecting a deviation in a telemetry value that exceeds a threshold limit.

The transmitted inertial data that is packaged in monitoring signal 137 can be raw output from IMU/inertial sensor(s) 122 of beacon 120, or can be 'cleaned', e.g. to remove noise or perform other pre-processing. One or more of the inertial data or the monitoring signal 137 can include a timestamp indicating the point in time at which the inertial data was measured or obtained by IMU 122. In some embodiments, the registration process between beacon 120 and drone 110 can include a synchronization step in which the two synchronize their clocks.

At every time step where an IMU reading is received, drone 110 can perform a dead-reckoning calculation to update the estimated location of the beacon. After receiving monitoring signal 137, drone 110 extracts the inertial information that IMU 122 measured for beacon 120 during the given time step. The inertial information is input to a trajectory prediction system of drone 110, which then generates an estimated current location of beacon 120 by using the inertial information to update a previous estimated location of beacon 120.

At time step t=1, Subject 130 has moved through his surrounding environment along the path indicated by the solid black line. Because Subject 130 is carrying beacon 120, i.e. in the form his mobile phone or smartphone, beacon 120 and Subject 130 move along substantially identical paths or trajectories. Beacon 120 broadcasts the inertial data $IMU_1$, which represents, for example, the series of inertial data measured by the IMU 122 between time steps t=0 and t=1. Drone 110 receives the broadcast from beacon 120, extracts the inertial data $IMU_1$ and provides it as input to the trajectory prediction function being calculated for the beacon 120.

In an error-free environment, given that acceleration a(t) is the second derivative of displacement, the displacement S along a given axis (x, y, or z) would be calculated simply as:

$$S_{real} = \iint a(t)dt \quad (1)$$

Updating the initial location of beacon 120 with the calculated displacement in the x, y, and z-axes would yield the dead-reckoning estimated location of beacon 120, and therefore Subject 130, at the given time t:

$$Beacon_t = Beacon_0 + (S_{real,x}, S_{real,y}, S_{real,z}) \quad (2)$$

However, IMU data is in reality subject to various different sources of error, bias, drift, etc., all of which lead to an accumulated error that can be approximated by an exponential function of time in the dead-reckoning calculation to estimate location, meaning that the error/uncertainty in the estimated location for beacon 120/Subject 130 likewise can be modeled as growing exponentially. Incorporating error terms into the IMU data $IMU_1$ and updating Equation (1) gives the following for the calculated displacement $S_{measured}$:

$$S_{measured} = S_{real} \pm S_{noise} \pm S_{thermal} \pm S_{resolution} \quad (3)$$

$$= \iint a(t)dt \pm \iint \Delta a_{noise}dt \pm$$

$$\iint \Delta a_{thermal}dt \pm \iint \Delta a_{resolution}dt$$

Where $\Delta a_{noise}$ is the inherent noise component of the IMU/inertial sensor 122, $\Delta a_{thermal}$ is the thermal noise contribution, and $\Delta a_{resolution}$ is the least-significant-bit error (i.e., introduced during the analog-to-digital conversion process), and each of these three noise components are represented as a three-dimensional vector that corresponds to the coordinates (x, y, z).

Taking $\Delta a_{thermal}$ to be negligible, $\Delta a_{noise}=100$ µg√t, and $\Delta a_{resolution}$ to be approximately 1% yields:

$$S_{measured} = S_{real}(1 \pm 0.01) \pm \frac{1}{2} \cdot 100 \text{ µg}t^2 \quad (4)$$

This error in the estimated location of beacon 120, i.e. the difference between $S_{measured}$ and $S_{real}$ is shown as the shaded ellipse surrounding the estimated location of the beacon at time step t=1. Notably, as seen in Equation (4), this error increases with the square of time t, meaning that estimated location of beacon 120 becomes less accurate for larger time steps t—the longer that drone 110 has been performing dead-reckoning tracking of beacon 120, the greater the uncertainty associated with each subsequent estimated location.

For example, this can be seen for time steps t=2 and t=3, where inertial data $IMU_2$ and $IMU_3$ are received, respectively, at the trajectory prediction function. Because the error term grows with the square of time, the ellipses representing the uncertainty of the estimated beacon location likewise increase between successive time steps. Based off of the most recent waypoint coordinate for the beacon, which at this point is $Beacon_0$, the trajectory prediction function calculates an estimated location for each time step at which IMU data is received from beacon 120:

$$Beacon_1 = Beacon_0 + \iint IMU_1$$

$$Beacon_2 = Beacon_1 + \iint IMU_2$$

$$Beacon_3 = Beacon_2 + \iint IMU_3 \quad (5)$$

It is noted that Equation (4) assumes that a single or constant navigational fix coordinate is used to perform the dead reckoning or inertial navigation calculation for beacon 120. Therefore, at any given time step t, the elapsed time since the navigational fix coordinate was obtained is always equal to t−0=t.

However, as contemplated by the present disclosure, drone 110 can be configured to calculate or otherwise determine one or more intermediate reference positions (tracking waypoints) of beacon 120, which can be used in lieu of or in conjunction with the beacon's initial reference location $Beacon_0$. In such an embodiment, the error in Equation (4) is reduced—the $t^2$ term does not measure elapsed time from t=0, but instead measures elapsed time from t=j, j>0, where time step j corresponds to the most recently determined intermediate reference point for beacon 120. By calculating these intermediate reference positions for beacon 120, the error in the estimated location of beacon 120 is reduced—instead of being calculated with reference to the elapsed time since $Beacon_0$ was measured, the $t^2$ term of Equation (4) is instead calculated with respect to the elapsed time since the most recent intermediate reference position for the beacon was determined. Therefore, if drone 110 determined an intermediate reference position for beacon 120 at time t=3, at time t=5 the error term in Equation (4) would be proportional to $(5-3)^2=4$, instead of being proportional to 25 as in the example above where no intermediate reference position was used.

One such example of drone 110 being used to determine an intermediate reference position (tracking waypoint) for beacon 120 is seen in time step t=4, where the shaded area of uncertainty that accumulated between t=0 and t=3 is no longer present.

At time step t=4, drone 110 determines its own current location (e.g. using a GPS sensor or optical flow) and then uses an onboard optical tracking or machine vision system to locate Subject 130 and calculate a relative position for Subject 130. Using the optically determined relative position of Subject 130, and the current known location of drone 110, the trajectory prediction function generates a new navigational fix coordinate for beacon 120, upon which future dead reckoning and inertial calculations will be based.

Intermediate reference positions for beacon 120 may not be calculated at every time step or with the same regularity as with which the IMU data is received from beacon 120. For example, intermediate reference positions might be calculated only when drone 110 is able to achieve optical recognition/tracking (i.e. there is the requisite line of sight), when drone 110 is able to achieve surpass some minimum threshold level in the confidence of the calculated intermediate reference position of beacon 120, or after some specified amount of time has elapsed since either the initial beacon fix coordinate $Beacon_0$ was measured or the last intermediate reference position was calculated.

At time step t=5, error once again begins to accumulate in the beacon location estimation calculation that uses the intermediate reference waypoint from time step t=4 and the IMU data $IMU_5$ that was most recently received at time step t=5. However, the error accumulation has been effectively "reset" since the basis for the inertial navigation calculation no longer stretches back in time to $Beacon_0$ and t=0.

At time step t=6, drone 110 again determines an intermediate reference or tracking waypoint for beacon 120, which is used as the new ground truth for future dead reckoning or inertial navigation calculations. Accordingly, no shaded error region is shown around the beacon location at t=6.

At time step t=7, drone 110 determines a new intermediate reference waypoint for beacon 120, and no error or uncertainty accumulates between t=6 and t=7. Although it is not always the case that drone 110 will determine intermediate reference waypoints with the same frequency with which it receives IMU or inertial data from beacon 120, when such intermediate reference waypoints are determined it is seen that they have the effect of dramatically reducing or eliminating the accumulated error that follows the form set forth in Equation (4).

The trajectory prediction function of the present disclosure can receive and utilize multiple inputs to determine an estimated location for beacon 120 (e.g. IMU data from beacon 120, GPS or location data from drone 110, relative position information of Subject 130 from an optical tracking/triangulation system of drone 110). However, the trajectory prediction function system is able to operate only on the basis of received IMU data, $IMU_t$, and use any additional information to augment or otherwise improve the accuracy of the existing estimated beacon location that is derived from the IMU data alone.

For any given time step, the trajectory prediction function calculates an updated estimated location of beacon 120 by using the IMU data to determine the beacon's displacement along each axis over the time period represented by the IMU data. The trajectory prediction function can additionally calculate a velocity vector for beacon 120 at each time step, based on the IMU data. These calculated data values can be stored, whether locally on drone 110, remote from drone 110, or some combination of the two. For each given time step, the trajectory prediction function can generate a series of values $T_i$: $(X_i, Y_i, Z_i)$; $(v_x, v_y, v_z)$ where $T_i$ is the i-th time step, $(X_i, Y_i, Z_i)$ is the estimated waypoint or location for the beacon device at time step $T_i$, and $(v_x, v_y, v_z)$ is the calculated velocity for the beacon device at the time step $T_i$. These series of waypoints can form a trajectory record for the path taken by beacon 120, and moreover, can be provided as inputs for the trajectory prediction function to extrapolate one or more future trajectories and or estimated locations for the beacon 120. In this manner, the trajectory prediction function can maintain tracking even if one or more IMU transmissions from beacon 120 are not received by drone 110, e.g. by using the last waypoint of the beacon, the last velocity calculated for the beacon, and the elapsed time since the last IMU transmission, to calculate an area or probability distribution in which the current beacon location might fall.

Based on the estimated location (waypoint) of beacon 120 at any given time step, drone 110 and the trajectory prediction function can calculate one or more of the relative orientation and the distance between drone 110 and beacon 120, such that drone 110 can better navigate through the surrounding environment while performing one or more assigned missions with respect to Subject 130. For example, the drone's navigation system 112 can use the calculated relative orientation and distance to navigate to a new orientation relative to Subject 130. As a particular example, consider a case in which a relative orientation of 90 degrees is calculated (indicating that Subject 130 is to the immediate right of drone 110), but drone 110 has been commanded to follow S from behind—therefore, navigation system 112 will cause the drone to navigate to a new relative orientation of approximately 0 degrees. In the course of this navigation, the relative distance between drone 110 and beacon 120 can be checked in order to maintain any required minimum separation between the drone and Subject 130.

In some embodiments, drone 110 can maintain awareness of its relative position and distance to Subject 130 while the drone simultaneously performs an evasive or higher priority maneuver, for example allowing drone 110 to continue tracking Subject 130 while the drone deviates from its previous trajectory in order to perform obstacle avoidance and fly below a large tree limb. Once the obstacle has been successfully avoided, navigation system 112 can use the continuous and real-time relative position and distance information between drone 110 and Subject 130 to generate commands causing drone 110 to fly back to the previously commanded or 'default' relative position and distance from beacon device 120/Subject 130. Advantageously, drone 110 can deviate from an otherwise commanded, desired, or selected path without any concerns of subsequently drifting off track from Subject 130 or losing track of the Subject altogether.

In the absence of any such deviations or updates route commands, drone 110 can use the output(s) of the presently disclosed trajectory prediction function and/or the calculated relative position between the drone and beacon 120 (carried by Subject 130) in order to more accurately and efficiently execute a previously requested and/or predetermined route profile or path, by constantly comparing its actual relative position to the Subject with an expected relative position that is specified by the route profile, and then maneuvering accordingly, e.g. slowing down if the drone is determined to be closer to the human target object than specified by the route profile, speeding up if the drone is determined to be farther from the human target object than specified by the route profile, etc. In some embodiments, the calculated relative position and distance data for the drone can be used to supplement an existing navigation scheme, such that the drone can use optical flow/navigation to route itself through the course of tracking the human or other target object.

Line of Sight (LOS) Losses

If a line of sight (LOS) loss occurs while the zone of potential error/uncertainty surrounding the estimated beacon location is relatively large, then it can be more difficult for tracking and localization to be recovered. Accordingly, it is contemplated that drone 110 can recover from LOS losses by augmenting or supplementing the received IMU data from beacon device 120 with GPS and optical triangulation data that are calculated locally by drone 110.

Unlike conventional approaches to autonomous tracking and localization of a moving target, the present disclosure is highly resistant to LOS losses between the tracking device (i.e. drone 110) and the target being tracked (i.e. Subject 130). This resistance to LOS losses is achieved in part by using beacon 120 to transmit movement or inertial data to drone 110, which uses the inertial data to calculate a predicted trajectory of beacon 120. Based on the predicted trajectory of beacon 120, the navigation system of drone 110 generates or updates a tracking trajectory that causes drone 110 to track Subject 130 in a desired or configured manner.

In one embodiment, the beacon device's inertial sensors 122 are used to determine real-time location and/or movement data of beacon 120, which is then periodically emitted via wireless communication interface 124 in the form of a monitoring signal 137. This monitoring signal 137 can be broadcast without a specific intended recipient, or can be transmitted specifically to one or more tracking devices, such as drone 110, that are registered or otherwise configured to track the Subject 130 or beacon 120. In some embodiments, monitoring signal 137 can be encrypted such that only permitted recipients can decrypt the monitoring signal 137 and extract the real-time location and/or movement data of beacon 120.

Figure 1B:
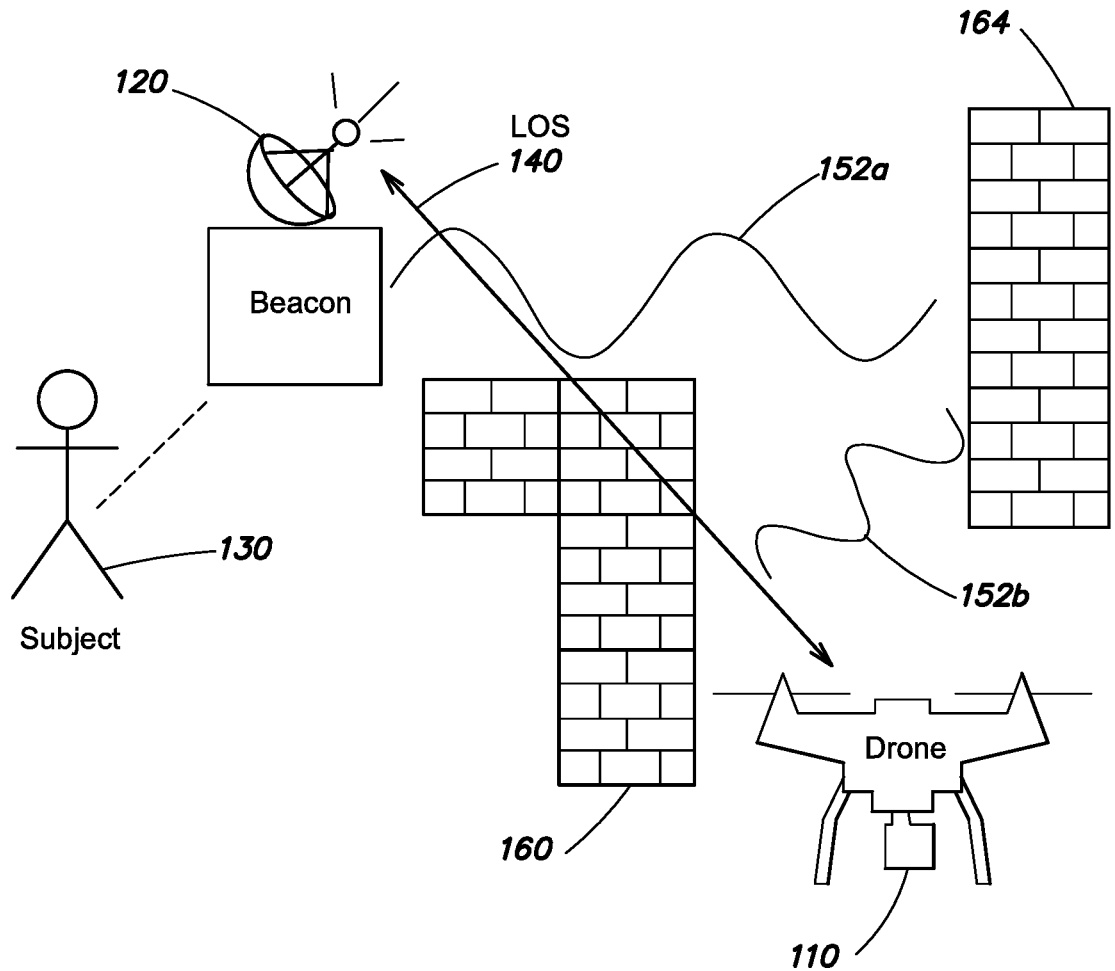
FIG. 1B depicts an example interaction between a tracking device and a beacon device according to one or more aspects of the present disclosure.

Advantageously, the use of a monitoring signal that can be wirelessly transmitted between beacon 120 and drone 110 permits the presently disclosed object tracking system to function even when there is no LOS present between the two devices. As seen in FIG. 1B, drone 110 and beacon 120 are separated by an obstacle 160 that blocks the LOS 140 between the drone and the beacon. Obstacle 160 could be a wall or a building, although more generally obstacle 160 can be any obstacle (including one or more intangible obstacles such as distance or interference) that blocks the LOS or otherwise interferes with the ability of drone 110 to receive monitoring signal 137 from beacon 120. As mentioned previously, beacon 120 can be carried by, attached to, or otherwise associated with a target such as Subject 130, for example by providing beacon 120 as the Subject 130's mobile phone or computing device.

As illustrated, drone 110 does not make use of the obstructed LOS 140 (i.e., the line connecting drone 110 and beacon 120, passing directly through obstacle 160) for purposes of receiving the monitoring signal 137 that is broadcast by beacon 120. Instead, drone 110 receives monitoring signal 137 over a different path 152, which can consist of one or more portions or sub-portions (i.e. shown here as first portion 152a and second portion 152b). The path 152 can be randomly selected, can be selected based on one or more properties of the wireless communication interface 114 of drone 110, and/or can be selected based on one or more onboard transmission criteria or properties the wireless communication interface 124 of beacon 120. Regardless of how the path 152 is selected, it is ultimately a path that does not provide a direct LOS between beacon 120 and drone 110, e.g. path 152 may be unobstructed and/or in a different direction than obstructed LOS 140.

The monitoring signal 137 traverses the first portion (152a) of path 152, and as illustrated, bounces off of a second obstacle 164 such that the reflected portion of monitoring signal 137 reaches drone 110 via a second portion (152b) of path 152, i.e. the portion between second obstacle 164 and drone 110. In this manner, monitoring signal 137 is passively relayed over the path 152 by virtue of its reflection off of the second obstacle 164. In some embodiments, second obstacle 164 can be replaced by an intermediate tracking device or a dedicated communication relay device, which would receive monitoring signal 137 from beacon 120 over the first path portion 152a, and then actively rebroadcast the monitoring signal over the second path portion 152b such that monitoring signal 137 is received by drone 110. The intermediate tracking device or communication relay can be provided by another drone, which may be similar or substantially identical to drone 110, that is configured to relay the monitoring signal 137 such that it is received by drone 110.

In some embodiments, a network of drones 110 may rebroadcast some or all of a plurality of monitoring signals 137 that the drones receive. The beacon device 120, before transmitting inertial data from IMU 122, can include a header or other flag in its monitoring signal transmission that indicates an intended recipient (e.g. the specific drone 110 that is tracking beacon 120). The intended recipient indicated in the header of monitoring signal 137 can be used to perform a point-to-point relay with the aforementioned intermediate devices, rather than the intermediate devices broadcasting in a wide manner. Drone 110 and beacon 120 can perform a registration process during which identifying information of drone 100 is provided to beacon 120 for use in the header or flag in the monitoring signal 137. For example, drone 110 and beacon 120 can perform a handshake or discovery process upon the initial deployment of drone 110 in the vicinity of beacon 120 in order to exchange the requisite information and establish a communication channel (e.g. establish a secured Bluetooth connection between drone 110 and the mobile phone of Subject 130, recalling that in this example the Subject's mobile phone comprises the beacon 120).

In some embodiments, when confronted with an obstructed LOS, beacon 120 can adjust its transmission frequency to a frequency that is able to penetrate the underlying obstacle 160 that is responsible for the obstructed LOS 140, e.g., by selecting a transmission frequency at which the obstacle 160 is transparent or at least partially transparent to monitoring signal 137/the carrier wave associated with monitoring signal 137. If such a transmission frequency is available, then beacon 120 can transmit monitoring signal 137 along the obstructed LOS 140 by using the identified transmission frequency. In some embodiments, the transmission power can be increased for scenarios in which beacon 120 is attempting to transmit through one or more obstructions, to account for any attenuation losses within the obstruction.

Figure 3:
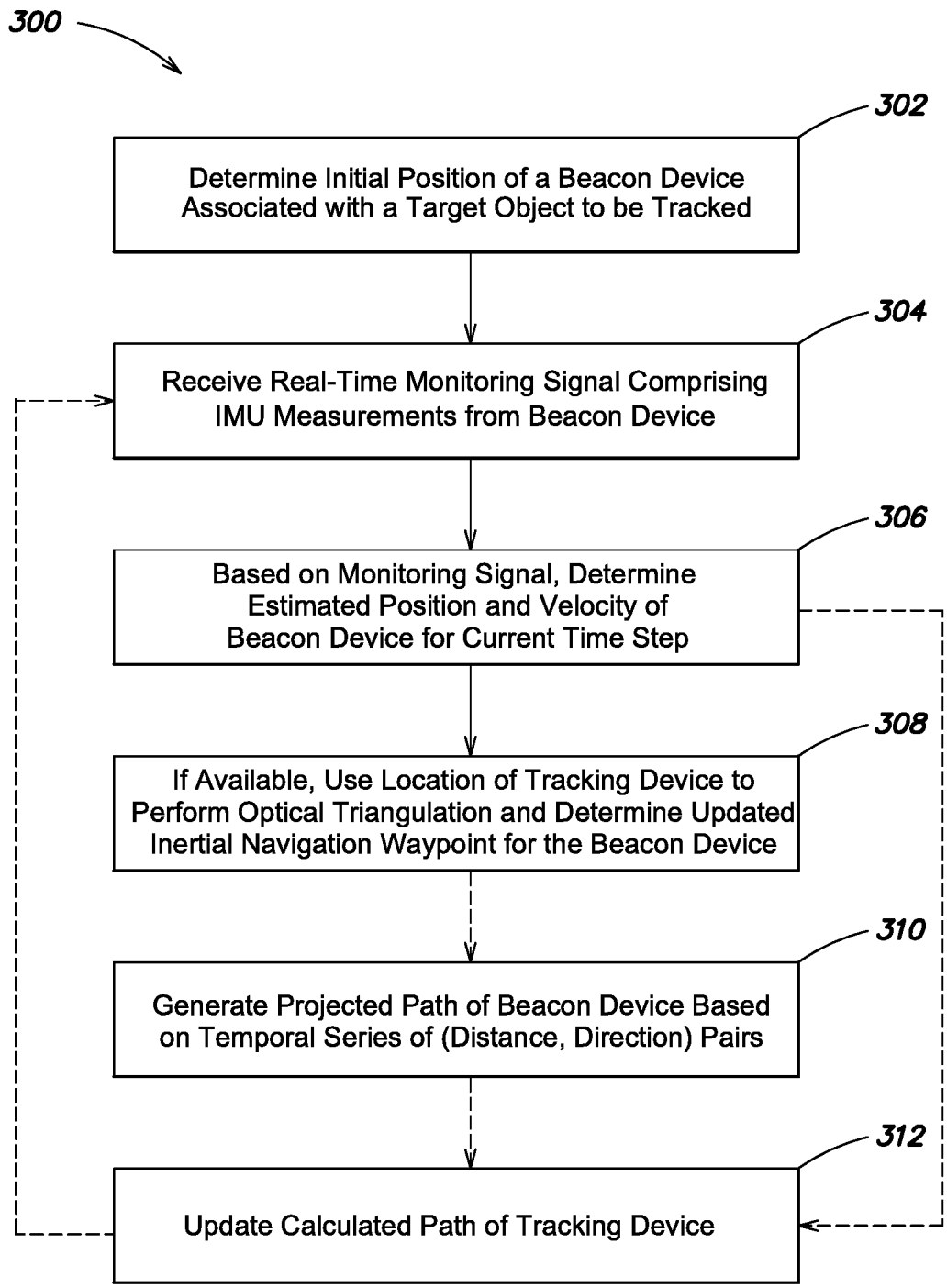
FIG. 3 depicts a method according to one or more aspects of the present disclosure.

FIG. 3 depicts an example method 300 according to one or more aspects of the present disclosure. As depicted, the method begins with a step 300, in which the initial location of a beacon device is determined. The initial location can be determined based on a measurement made by the beacon device itself, determined based on a measurement made external to the beacon device, or some combination of the two. In some embodiments, the beacon device is associated with a target object that is to be tracked, e.g. a human, an animal, an object identified by a human, etc. The initial location can be determined from one or more satellite-based systems such as GPS, GLONASS, and Baidu. For example, the beacon device can be provided by a mobile phone associated with a Subject, who is the target to be tracked. A registration process can pair or otherwise communicatively couple the beacon device with a drone, which will perform the autonomous tracking and localization of the Subject. In some embodiments, such as those where the beacon device might not be provided with its own location module (i.e. to save manufacturing expense and complexity, to increase battery life, decrease size of the beacon device, etc.) the initial location of the beacon device can be set to be substantially equal to the initial location of the drone or tracking device, which is determined by a GPS or other onboard location sensor or module.

In a step 304, a substantially real-time monitoring signal is received from the beacon device, where the monitoring signal comprises at least IMU measurements from the beacon device, measured as the Subject moves through his or her environment while carrying the beacon device. These IMU measurements can be instantaneous values, or some time-series of historical values accumulated over some interval, e.g. the IMU measurements accumulated since the last monitoring signal was transmitted by the beacon device. The IMU measurements represent information regarding the movement (e.g. velocity, acceleration, rotation) in multiple axes, planes, and/or coordinate systems and reference frames. In some embodiments, one or more of the IMU measurements can be associated with an uncertainty or an expected error, which may be provided as part of the transmitted monitoring signal (e.g. as a header to the IMU data itself) or can be configured in memory of a tracking device that received the monitoring signal. In some embodiments, the tracking device itself can determine or estimate an uncertainty or error associated with one or more monitoring signals that it receives from a given beacon device.

In a next step 306, the monitoring signal information is analyzed in order to determine one or more of an estimated current location (waypoint) of the beacon device and a current velocity of the beacon device. In some embodiments, the estimated current location can be calculated by using inertial data contained within the monitoring signal to perform dead-reckoning or other inertial navigation calculations, in which a previous location or known waypoint of the beacon device is updated based on displacement information calculated from the inertial data. In some embodiments, these calculations may be performed relative to the tracking device which received the monitoring signal, e.g. the tracking device receives the monitoring signal and subsequently determines the distance between itself and the beacon device and determines the relative direction or heading between itself and the beacon device. In some embodiments, these calculations (i.e. the determining) can be performed remote to the tracking device, with the results of the calculation then transmitted to the tracking device over a communication network.

In particular, in a given time step, the trajectory prediction system determines movement information from the IMU data and then updates the previously estimated beacon location based on the calculated movement over that time step. As a basic example, at time t=0, the location of the beacon is the same as the location of the drone: $Beacon_0 = Drone_0$. At time t=1, the drone receives a monitoring signal from the beacon and then extracts the IMU data from the monitoring signal. The IMU data is converted into movement data, e.g. by performing a double integration over the given time step. If a movement of 9 feet in the direction of the x-axis is detected, then the current estimated location of the beacon, $Beacon_1$, will equal the previous location of the beacon shifted 9 feet along the x-axis, i.e. $Beacon_1 = Beacon_0 + (9,0,0)$. The trajectory prediction system can similarly convert the IMU data into a velocity vector for the beacon device by performing a single integration over the given time step.

In a step 308, the wireless transmissions/inertial data received from the beacon device can be augmented or supplemented by additional sources of data, which include a visual or machine vision-determined relative position of the beacon device/Subject (i.e. the position of the beacon device/Subject relative to the location of the tracking device), and a known current coordinate of the tracking device (e.g. determined from a GPS or positioning system, or an optical flow system). In this manner, GPS and optical triangulation can be used to compensate for missing inertial data as well as any accumulated drift or bias error in the IMU/inertial data measurements themselves, where subsequently estimated beacon locations will be calculated by using the IMU data to determine the beacon's displacement from the most recent intermediate beacon waypoint that was determined via the aforementioned optical triangulation.

In some embodiments, the GPS data and IMU data can be combined, e.g., to confirm the aforementioned calculations or to arrive at a more accurate result in combination. In some embodiments, the trajectory prediction function can minimize the impact of such errors and drift by calculating one or more correction values based on static and/or dynamic attributes of the IMU or other inertial sensor. For example, these IMU or inertial sensor attributes might be provided by their manufacturer, and can be programmed into the tracking device, can be experimentally determined or characterized during the registration of the beacon device containing the IMU/inertial sensors with the tracking device, etc. In some embodiments, these correction values can be calculated based on the output of the navigation system within the tracking device itself, such that the tracking device and the beacon device are at least synchronized such that they experience error and drift in the same manner, even though neither provide an absolutely or objectively correct measurement—in other words, the tracking device and beacon device will be synchronized such that they both measure the same movements and location change(s) over a given interval.

In some embodiments, a temporal series of (estimated location, velocity) pairs for the beacon device are stored, for example as a past trajectory of the beacon. This temporal series can be thought of as comprising a historical log of beacon device's path and environmental interactions at various different points in time, i.e. at different distinct time steps. This provides insight into the historical interactions and relative positioning seen between the tracking device and the beacon device. In some embodiments, the temporal series of (distance, direction) pairs can be used to generate a projected future path of the beacon device and allow the tracking device (such as a drone) to perform the autonomous tracking and localization of the present disclosure.

This is illustrated as a step 310. Various different algorithms and path projection schemes can be employed to generate the projected path (or paths) of the beacon device, and additionally, the path projection can be performed over an adjustable future time window. For example, path projection might only be performed for the next 5 seconds of movement for the beacon device, which might be useful in situations in which computing power is limited, the confidence level of the projection is low, insufficient information is available for a longer or more forward-looking projection, etc. As another example, path projection might be performed for the next 5 minutes of movement for the beacon device in scenarios in which computing power is not a limiting factor, the confidence level of the projection will be high, the beacon device has substantially settled into a steady state movement pattern (e.g., as determined based on the temporal series of (distance, direction) pairs), etc.

The tracking device can store (either locally or at a remote database or storage device), the previously described series of waypoints/estimated locations and velocity vectors calculated for the beacon device at a plurality of time steps $T_i$, i.e. one waypoint-velocity pair per received monitoring signal 137. In some embodiments, the trajectory prediction function the tracking device can predict or model a future location of the beacon device based on the previously received monitoring signals 137 and/or this series of previously determined waypoints and velocity vectors. In doing so, the tracking device analyzes one or more previous movement intervals of beacon 120 (e.g. average speed over prior minute, average speed over prior five minutes, instantaneous speed of last monitoring signal, etc.) to generate one or more modeled paths and locations at which the beacon device could presently be. Upon receipt of the next monitoring signal, the actual new relative position of the beacon device can be compared to the modeled/predicted relative positions that were calculated, with the difference or error being used to continuously refine the model(s) applied by the tracking device, such that this modeling becomes more accurate over time.

In a step 312, an updated calculated path for the tracking device is generated, such that the tracking device (e.g. drone) will continue to perform tracking of the beacon device while also adhering to one or more other mission parameters or other secondary/additional control parameters configured for the first tracking device. In some embodiments, the updated path for the first tracking device can be calculated based on the projected path of the beacon device from step 310, the current (distance, direction) pair between the beacon device and the first tracking device as determined in step 306, or some combination of the two. Once the updated path for the first tracking device has been calculated, the first tracking device can be controlled or updated to implement this updated path, at which point the method returns to step 304 to await/receive another transmission of a substantially real-time monitoring signal from the beacon device comprising the newest IMU measurements that have been collected.

Figure 4:
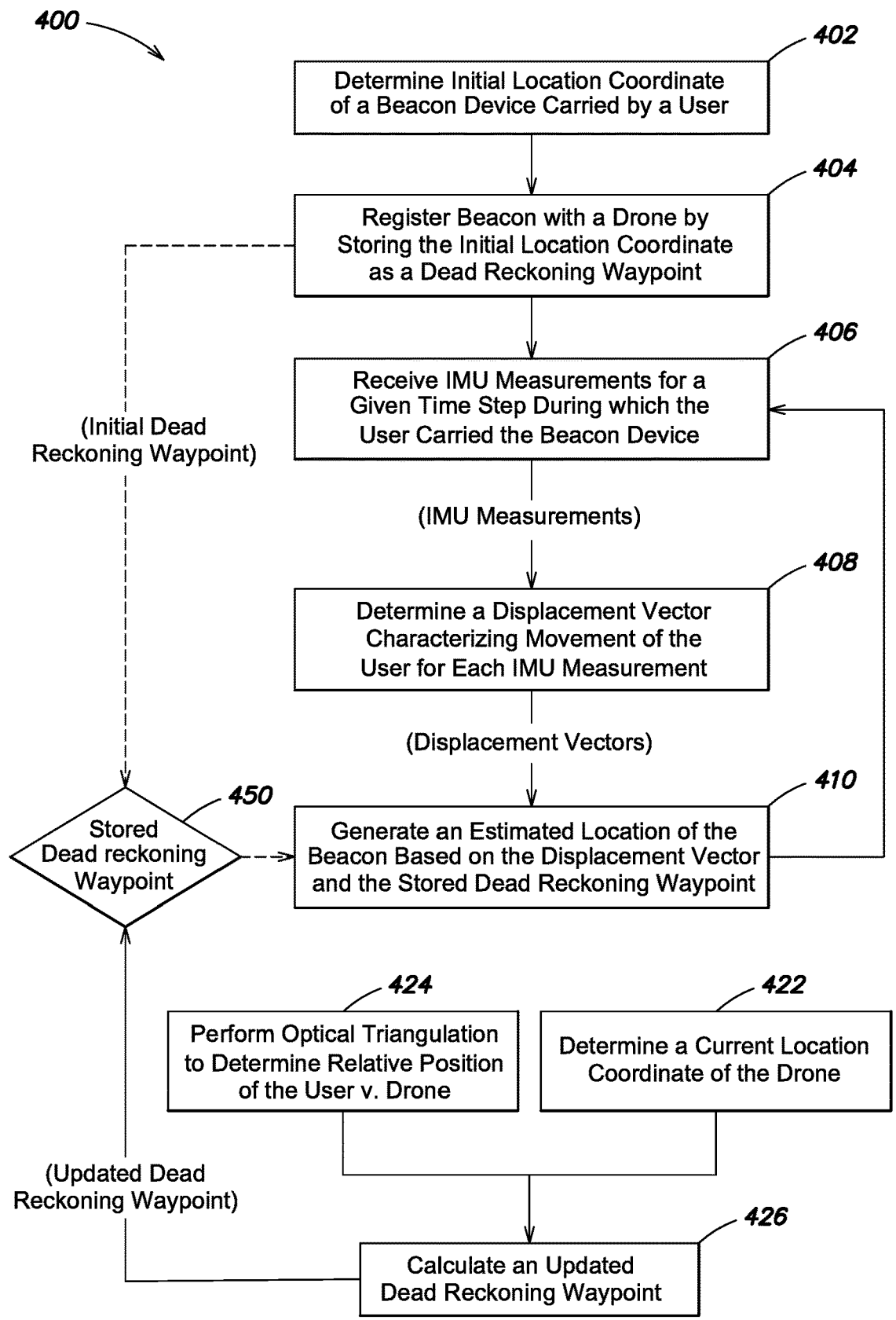
FIG. 4 depicts another example method according to one or more aspects of the present disclosure.

FIG. 4 depicts another example method 400 according to aspects of the present disclosure, in which a drone is configured to autonomously track and localize a user (such as a human Subject) while the user is carrying a beacon device (such as his or her smartphone or mobile computing device).

In a step 402, an initial location coordinate of the beacon device carried by the user is determined. In some embodiments, the initial location coordinate is determined to be equal to the initial location coordinate of the drone, based on the assumption that the user carries the beacon device on his body and launches the drone from his hand or general vicinity of his body as well. In some embodiments, an offset amount can be applied to obtain the initial location coordinate of the beacon device from the initial location coordinate of the drone.

In a step 404, the beacon device is registered with the drone. The registration process can include transmitting the initial location coordinate to the drone, or otherwise causing the drone to store the initial location coordinate of the beacon device in its memory as a dead reckoning waypoint, which will be used to perform future dead reckoning or inertial navigation with respect to the beacon device.

The storage of the initial dead reckoning waypoint in memory is indicated at 450, which illustrates the Stored Dead Reckoning Waypoint. This memory can be local to the drone, or remote to the drone and wirelessly accessible in a substantially real-time fashion. In some embodiments, a new Stored Dead Reckoning Waypoint is generated and saved in memory for every new tracking session initiated by the user (e.g. every time that the registration step 404 takes place). In some embodiments, a new Stored Dead Reckoning Waypoint might be prompted for or otherwise obtained in response to a pre-determined amount of time elapsing, e.g. a previously stored dead reckoning waypoint for the beacon device "expires" and is unlikely to be accurate because too much time has passed since it was collected.

In a step 406, the drone receives one or more IMU measurements from the beacon device, where the IMU measurements correspond to movements of the user during some time step, as sensed or detected by an IMU or other inertial sensor disposed on or within the beacon device.

At a step 408, the drone determines a displacement vector characterizing the movements of the user as contained within or indicated by a given one of the IMU measurements. In some embodiments, these movements or displacements are calculated for each axis along which the IMU can obtain measurements (e.g. x, y, and z). For example, these displacement values can be calculated as described previously in Equations (1)-(5).

At a step 410, an estimated location of the beacon is generated based on the displacement vector and the stored dead reckoning waypoint of 450. In some embodiments, the estimated location of the beacon can be obtained by performing a dead reckoning calculated, as also described previously with respect to one or more of Equations (1)-(5). After step 410, the method returns to step 406, where IMU measurements are received for the next time step and the corresponding estimated location of the beacon device is then calculated for that next time step.

It is noted that as IMU measurements continue to be received, and new estimated locations for the beacon continued to be generated (e.g. as time passes/for subsequent ones of a series of time steps), the beacon location estimation calculation of step 410 continues to rely on the same stored dead reckoning waypoint 450, which at first is given by the value of the initial dead reckoning waypoint calculated in the registration process of step 404. Therefore, IMU error and drift can accumulate with the square of time, as described previously with respect to Equations (1)-(5).

Accordingly, at some other point in time (that does not necessarily bear any relation to the time steps or increment/ interval in which IMU measurements are received at step 406), an updated dead reckoning waypoint is calculated in order to effectively "reset" or otherwise substantially eliminate the accumulated IMU drift or error that decreases the accuracy of the estimated beacon locations generated at step 410.

At a step 422, a current location coordinate of the drone is determined, e.g. by using GPS or an optical flow system, either of which may be disposed on the drone or located remotely with their output wirelessly transmitted to the drone. It is noted that the location coordinate determined in step 422 can be determined in substantially the same way or manner as the location coordinate determined in step 402.

In a step 424, optical triangulation is performed to determine the relative position of the user with respect to the drone. Optical triangulation can be performed by a machine vision system onboard the drone, which utilizes as input one or more video data frames captured by one or more cameras also located or disposed onboard the drone or drone chassis. In some embodiments, example optical tracking and/or machine vision systems or algorithms that can be employed to locate the Subject (or user being tracked) include, but are not limited to, YOLO, SSD, fast RCNN and all of their tiny and mobile versions (see, for example, commonly owned U.S. patent application Ser. No. 16/416,887 filed May 20, 2019 for "SYSTEMS AND METHODS FOR REAL-TIME ADJUSTMENT OF NEURAL NETWORKS FOR AUTONOMOUS TRACKING AND LOCALIZATION OF MOVING SUBJECT", the contents of which are hereby incorporated by reference; see also, as cited in commonly owned U.S. Ser. No. 16/416,887: "You Only Look Once: Unified, Real-Time Object Detection" and "*YOLOv3: An Incremental Improvement*", Joseph Redmon et al., University of Washington; "*Spatially Supervised Recurrent Convolutional Neural Networks for Visual Object Tracking*", Guanghan Ning et al., University of Missouri; "*Learning View-Specific Deep Networks for Person Re-Identification*", Zhanxiang Feng et al., IEEE Transactions on Image Processing; and "*Person Re-Identification in the Wild*", Liang Zheng et al., University of Technology Sydney).

In a step 426, an updated dead reckoning waypoint is calculated for the beacon device, based on both the current location coordinate of the drone (determined in step 422) and the relative position of the user (Subject) with respect to the drone (determined in step 424). In some embodiments, the updated dead reckoning waypoint is calculated by obtaining one or more frames of visual data captured by a camera disposed on the drone, and then analyzing the frames of visual data to identify any frames in which the location of the user within the frame can be identified. Those frames where the location of the user can successfully be identified are referred to as detection frames, and the location of the user within the frame may be represented by, for example, an (x,y) pixel coordinate referencing a position somewhere with the detection frame (i.e. the frame of visual data). From the detection frame(s), a three-dimensional spatial position of the user is extrapolated based on one or more calculated projection vectors. The projection vectors are calculated from the sensor of the camera (as disposed on the drone) that captured the given detection frame, to the identified locations of the user within the detection frame (i.e. the pixel coordinates discussed above), such that the intersection of two or more projection vectors with initial points set to the GPS location of the drone at the moment each of the underlying detection frames were captured, respectively, yields a calculated coordinate or vector representing the user's position with respect to the drone.

The output of step 426, the updated dead reckoning waypoint, is used to update the Stored Dead Reckoning Waypoint stored in memory at 450. Subsequently, the dead reckoning or inertial calculation used to generate estimated locations of the beacon device in steps 406-410 will be based on or calculated with reference to the updated dead reckoning waypoint as the stored dead reckoning waypoint (in lieu of the old, initial dead reckoning waypoint from step 404, which yields a less accurate result that is subject to the effects of more accumulated IMU error/drift than the updated dead reckoning waypoint from step 426). Advantageously, the updated dead reckoning waypoint for the beacon device is calculated without having to rely on any of the previously calculated estimated positions of the beacon device, and is instead able to be calculated solely on the basis of the current location coordinate of the drone (e.g. GPS or optical flow) and the optically triangulated relative position between the drone and the user.

Figure 5A:
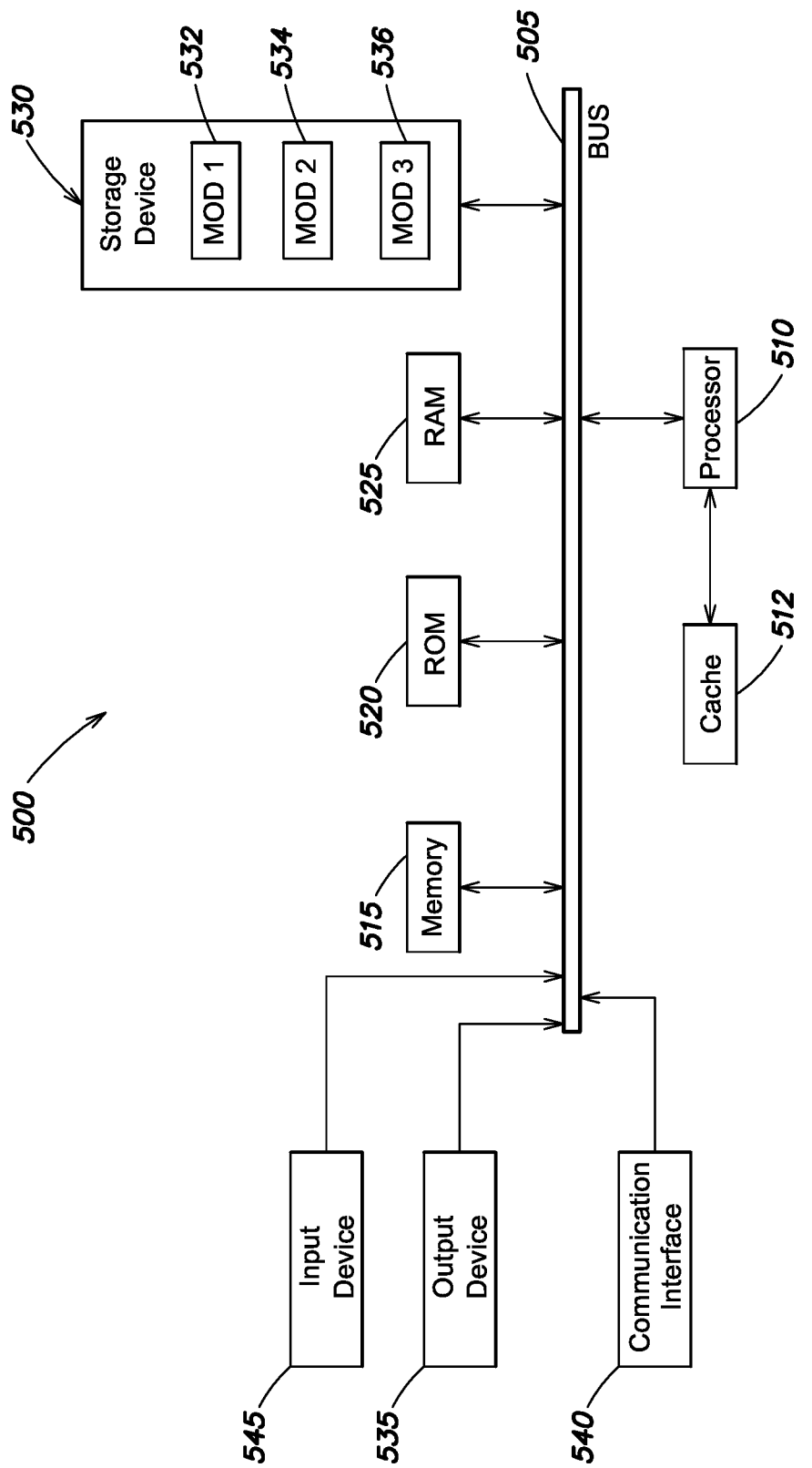
FIG. 5A depicts a system bus computing system architecture in which one or more aspects of the present disclosure may be provided.
Figure 5B:
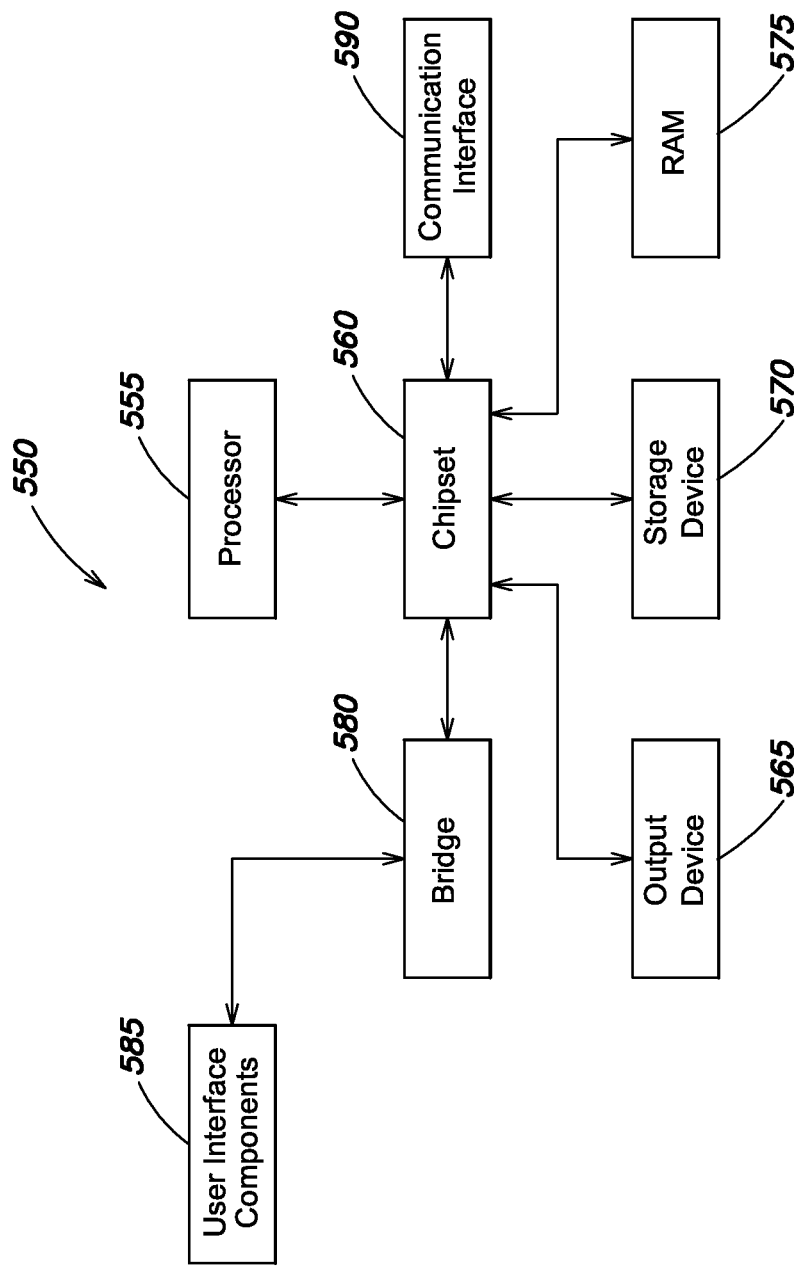
FIG. 5B depicts an example computer system chipset architecture in which one or more aspects of the present disclosure may be provided.

FIG. 5A and FIG. 5B illustrate example system embodiments in which one or more aspects of the present disclosure may be provided, deployed, or configured. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. An autonomous object tracking method for tracking a user with a drone configured to track the user, the method comprising:
   obtaining an initial location coordinate of a beacon device carried by the user, wherein the beacon device comprises at least an inertial measurement unit (IMU) and a wireless transceiver;
   registering the beacon device with the drone, wherein registering comprises storing the initial location coordinate of the beacon device as a dead reckoning waypoint for the beacon device;
   receiving, from the beacon device, a plurality of IMU measurements, wherein each given IMU measurement is measured over a given time step in which the beacon device is carried by the user;

for each given IMU measurement of the plurality of IMU measurements, calculating an estimated location of the beacon device by:

determining, from the given IMU measurement and its given time step, a displacement vector characterizing movement of the user over the given time step; and performing dead reckoning based at least in part on the displacement vector and the dead reckoning waypoint of the beacon device, such that the estimated location of the beacon device comprises a cumulative displacement from the dead reckoning waypoint of the beacon device;

calculating an updated dead reckoning waypoint for the beacon device, where the updated dead reckoning waypoint does not depend on the previously estimated locations of the beacon device, and the calculating is triggered in response to receiving an indication that an optical analysis system of the drone has located the user in one or more frames of visual data captured by a camera disposed on the drone, by:

obtaining a current location coordinate of the drone;

performing optical triangulation to determine a relative position of the user with respect to the drone, the optical triangulation comprising:

obtaining one or more frames of visual data captured by a camera disposed on the drone;

analyzing the frames of visual data to identify a location of the user within a given frame, wherein detection frames are the given frames in which the location of the user is successfully identified; and extrapolating a three-dimensional spatial position of the user based on one or more calculated projection vectors extending from a sensor of the camera disposed on the drone to the identified locations of the user within the detection frames; and generating the updated dead reckoning waypoint for the beacon device based on the current location coordinate of the drone and the relative position of the user with respect to the drone.

2. The method of claim 1, wherein:

the current location coordinate of the drone is obtained for each detection frame;

for a given detection frame, the calculated projection vector is obtained by using the corresponding current location coordinate of the drone as the location of the sensor of the camera disposed on the drone; and the updated dead reckoning waypoint for the beacon device is calculated as the coordinates of the terminal point of the calculated projection vector.

3. The method of claim 1, wherein the current location coordinate of the drone is determined by an optical flow system or a location sensor of the drone.

4. The method of claim 1, wherein optical triangulation is performed in response to one or more of:

failing to receive a monitoring signal for a pre-determined amount of time;

determining that an error or uncertainty associated with one or more of the estimated locations of the beacon device exceeds a pre-determined threshold; or receiving an indication that an optical analysis system of the drone has located the user in one or more frames of visual data captured by a camera disposed on the drone.

5. The method of claim 1, wherein an onboard processor of the drone is used to calculate one or more of: the estimated locations of the beacon device, the displacement vector characterizing movement of the user over the given time step, the relative position of the user with respect to the drone, and the updated dead reckoning waypoint for the beacon device.

6. The method of claim 1, where the drone comprises an unmanned aerial vehicle (UAV) or an unmanned aircraft system (UAS).

7. The method of claim 1, where the initial location of the beacon device is determined as being equal to an initial location of the drone.

8. The method of claim 1, where the initial location of the beacon device is determined by applying a pre-determined offset to an initial location of the drone.

9. The method of claim 1, wherein the beacon device comprises a mobile computing device carried by the user.

10. The method of claim 9, wherein the beacon device further comprises a mobile application installed on the mobile computing device carried by the user, such that the mobile application communicates with one or more sensors of the mobile computing device in order to obtain the plurality of IMU measurements.

11. The method of claim 1, further comprising:

updating a calculated path of the drone based on one or more of the estimated locations of the beacon device, wherein the calculated path causes the drone to follow the user according to one or more pre-determined parameters; and generating a projected path of the beacon device based at least in part on one or more velocity vectors calculated from the IMU measurements.

12. The method of claim 1, further comprising calculating correction values to minimize random errors and drift in the IMU measurements, the correction values based at least in part on one or more of the optical triangulation and the current location coordinate of the drone.

13. The method of claim 12, wherein the correction values are calculated based at least in part on a difference between the estimated location of the beacon device as calculated by using the initial location coordinate of the beacon device as the dead reckoning waypoint, and an estimated location of the beacon device as calculated by using the updated dead reckoning waypoint, where both estimated locations of the beacon device are calculated at a same time step.

14. The method of claim 11, wherein the calculated path of the drone is updated to maintain one or more tracking parameters specifying a desired arrangement between the drone and one or more of the beacon device and the user.

15. The method of claim 1, wherein the wireless transceiver of the beacon device comprises one or more of the following: a Bluetooth transceiver, a Bluetooth Low Energy transceiver, a WiFi transceiver, and a near-field transceiver.

16. The method of claim 1, where the initial location of the beacon device is determined based on one or more of a Global Positioning System (GPS) signal, a Global Navigation Satellite System (GLONASS) signal, and a Baidu signal.

17. An autonomous object tracking system for tracking a user with an autonomous drone, the system comprising:

a beacon device configured to be carried the user, the beacon device comprising at least an inertial measurement unit (IMU) and a wireless transceiver; and a drone configured to autonomously track the user, the drone comprising:

one or more processors; and at least one non-transitory medium having stored therein instructions which, when executed by the one or more processors cause the one or more processors to perform actions comprising:
- obtaining an initial location coordinate of the beacon device as carried by the user;
- registering the beacon device with the drone, wherein registering comprises storing the initial location coordinate of the beacon device as a dead reckoning waypoint for the beacon device;
- receiving, from the beacon device, a plurality of IMU measurements, wherein each given IMU measurement is measured over a given time step in which the beacon device is carried by the user;
- for each given IMU measurement of the plurality of IMU measurements, calculating an estimated location of the beacon device by:
  - determining, from the given IMU measurement and its given time step, a displacement vector characterizing movement of the user over the given time step; and
  - performing dead reckoning based at least in part on the displacement vector and the dead reckoning waypoint of the beacon device, such that the estimated location of the beacon device comprises a cumulative displacement from the dead reckoning waypoint of the beacon device;
- calculating an updated dead reckoning waypoint for the beacon device, where the updated dead reckoning waypoint does not depend on the previously estimated locations of the beacon device, and the calculating is triggered in response to receiving an indication that an optical analysis system of the drone has located the user in one or more frames of visual data captured by a camera disposed on the drone, by:
  - obtaining a current location coordinate of the drone;
  - performing optical triangulation to determine a relative position of the user with respect to the drone, the optical triangulation comprising;
    - obtaining one or more frames of visual data captured by a camera disposed on the drone;
    - analyzing the frames of visual data to identify a location of the user within a given frame, wherein detection frames are the given frames in which the location of the user is successfully identified; and
    - extrapolating a three-dimensional spatial position of the user based on one or more calculated projection vectors extending from a sensor of the camera disposed on the drone to the identified locations of the user within the detection frames; and
  - generating the updated dead reckoning waypoint for the beacon device based on the current location coordinate of the drone and the relative position of the user with respect to the drone.

18. The system of claim 17, where the instructions further cause the one or more processors to:
- obtain the current location coordinate of the drone for each detection frame;
- for a given detection frame, obtain the calculated projection vector by using the corresponding current location coordinate of the drone as the location of the sensor of the camera disposed on the drone; and
- calculate the updated dead reckoning waypoint for the beacon device as the coordinates of the terminal point of the calculated projection vector.

19. The system of claim 17, where the instructions further cause the one or more processors to determine the current location coordinate of the drone using an optical flow system or a location sensor of the drone.

20. The system of claim 17, where the instructions cause the one or more processors to perform optical triangulation in response to one or more of:
- failing to receive a monitoring signal for a pre-determined amount of time; or
- determining that an error or uncertainty associated with one or more of the estimated locations of the beacon device exceeds a pre-determined threshold.

21. The system of claim 17, where the instructions cause the one or more processors to calculate one or more of: the estimated locations of the beacon device, the displacement vector characterizing movement of the user over the given time step, the relative position of the user with respect to the drone, and the updated dead reckoning waypoint for the beacon device.

22. The system of claim 17, where the drone comprises an unmanned aerial vehicle (UAV) or an unmanned aircraft system (UAS).

23. The system of claim 17, where the instructions cause the one or more processors to determine the initial location of the beacon device as being equal to an initial location of the drone.

24. The system of claim 17, where the instructions cause the one or more processors to determine the initial location of the beacon device by applying a pre-determined offset to an initial location of the drone.

25. The system of claim 17, wherein the beacon device comprises a mobile computing device carried by the user.

26. The system of claim 25, wherein the beacon device further comprises a mobile application installed on the mobile computing device carried by the user, such that the mobile application communicates with one or more sensors of the mobile computing device in order to obtain the plurality of IMU measurements.

27. The system of claim 17, where the instructions further cause the one or more processors to perform actions comprising:
- updating a calculated path of the drone based on one or more of the estimated locations of the beacon device, wherein the calculated path causes the drone to follow the user according to one or more pre-determined parameters; and
- generating a projected path of the beacon device based at least in part on one or more velocity vectors calculated from the IMU measurements.

28. The system of claim 17, where the instructions cause the one or more processors to perform actions comprising calculating correction values to minimize random errors and drift in the IMU measurements, the correction values based at least in part on one or more of the optical triangulation and the current location coordinate of the drone.

29. The system of claim 28, wherein the correction values are calculated based at least in part on a difference between the estimated location of the beacon device as calculated by using the initial location coordinate of the beacon device as the dead reckoning waypoint, and an estimated location of the beacon device as calculated by using the updated dead reckoning waypoint, where both estimated locations of the beacon device are calculated at a same time step.

30. The system of claim 27, where the instructions further cause the one or more processors to update the calculated path of the drone to maintain one or more tracking parameters specifying a desired arrangement between the drone and one or more of the beacon device and the user.

31. The system of claim 17, wherein the wireless transceiver of the beacon device comprises one or more of the following: a Bluetooth transceiver, a Bluetooth Low Energy transceiver, a WiFi transceiver, and a near-field transceiver.

32. The system of claim 17, where the instructions further cause the one or more processors to determine the initial location of the beacon device based on one or more of a Global Positioning System (GPS) signal, a Global Navigation Satellite System (GLONASS) signal, and a Baidu signal, as measured by a corresponding sensor on the drone.

33. An autonomous object tracking device configured to track a user, the device comprising:
    at least one processor; and
    at least one memory storing instructions, which when executed causes the at least one processor to perform actions comprising:
        obtaining an initial location coordinate of a beacon device carried by the user, wherein the beacon device comprises at least an inertial measurement unit (IMU) and a wireless transceiver;
        registering the beacon device with the tracking device, wherein registering comprises storing, in the at least one memory, the initial location coordinate of the beacon device as a dead reckoning waypoint for the beacon device;
        receiving, from the beacon device, a plurality of IMU measurements, wherein each given IMU measurement is measured over a given time step in which the beacon device is carried by the user;
        for each given IMU measurement of the plurality of IMU measurements, calculating an estimated location of the beacon device by:
            determining, from the given IMU measurement and its given time step, a displacement vector characterizing movement of the user over the given time step; and
            performing dead reckoning based at least in part on the displacement vector and the dead reckoning waypoint of the beacon device, such that the estimated location of the beacon device comprises a cumulative displacement from the dead reckoning waypoint of the beacon device;
        calculating an updated dead reckoning waypoint for the beacon device, where the updated dead reckoning waypoint does not depend on the previously estimated locations of the beacon device and the calculating is triggered in response to receiving an indication that an optical analysis system of the tracking device has located the user in one or more frames of visual data captured by a camera disposed on the tracking device, by:
            obtaining a current location coordinate of the tracking device;
            performing optical triangulation to determine a relative position of the user with respect to the tracking device, the optical triangulation comprising;
                obtaining one or more frames of visual data captured by a camera disposed on the tracking device;
                analyzing the frames of visual data to identify a location of the user within a given frame, wherein detection frames are the given frames in which the location of the user is successfully identified; and
                extrapolating a three-dimensional spatial position of the user based on one or more calculated projection vectors extending from a sensor of the camera disposed on the tracking device to the identified locations of the user within the detection frames; and
            generating the updated dead reckoning waypoint for the beacon device based on the current location coordinate of the tracking device and the relative position of the user with respect to the tracking device.

34. The tracking device of claim 33, where the instructions further cause the one or more processors to:
    obtain the current location coordinate of the tracking device for each detection frame;
    for a given detection frame, obtain the calculated projection vector by using the corresponding current location coordinate of the tracking device as the location of the sensor of the camera disposed on the tracking device; and
    calculate the updated dead reckoning waypoint for the beacon device as the coordinates of the terminal point of the calculated projection vector.

35. The tracking device of claim 33, where the instructions further cause the one or more processors to determine the current location coordinate of the tracking device using an optical flow system or a location sensor of the tracking device.

36. The tracking device of claim 33, where the instructions cause the one or more processors to perform optical triangulation in response to one or more of:
    failing to receive a monitoring signal for a pre-determined amount of time; or
    determining that an error or uncertainty associated with one or more of the estimated locations of the beacon device exceeds a pre-determined threshold.

37. The tracking device of claim 33, where the instructions cause the one or more processors to calculate one or more of: the estimated locations of the beacon device, the displacement vector characterizing movement of the user over the given time step, the relative position of the user with respect to the tracking device, and the updated dead reckoning waypoint for the beacon device.

38. The tracking device of claim 33, where the tracking device comprises a drone, an unmanned aerial vehicle (UAV), or an unmanned aircraft system (UAS).

39. The tracking device of claim 33, where the instructions cause the one or more processors to determine the initial location of the beacon device as being equal to an initial location of the tracing device.

40. The tracking device of claim 33, where the instructions cause the one or more processors to determine the initial location of the beacon device by applying a pre-determined offset to an initial location of the tracking device.

41. The tracking device of claim 33, wherein the tracking device receives the plurality of IMU measurements as transmitted from a mobile application installed on a mobile computing device carried by the user, where the mobile application comprises the beacon device.

42. The tracking device of claim 33, where the instructions further cause the one or more processors to perform actions comprising:
    updating a calculated path of the tracking device based on one or more of the estimated locations of the beacon device, wherein the calculated path causes the tracking device to follow the user according to one or more pre-determined parameters; and generating a projected path of the beacon device based at least in part on one or more velocity vectors calculated from the IMU measurements.

43. The tracking device of claim 33, where the instructions cause the one or more processors to perform actions comprising calculating correction values to minimize random errors and drift in the IMU measurements, the correction values based at least in part on one or more of the optical triangulation and the current location coordinate of the tracking device.

44. The tracking device of claim 43, wherein the correction values are calculated based at least in part on a difference between the estimated location of the beacon device as calculated by using the initial location coordinate of the beacon device as the dead reckoning waypoint, and an estimated location of the beacon device as calculated by using the updated dead reckoning waypoint, where both estimated locations of the beacon device are calculated at a same time step.

45. The tracking device of claim 33, wherein the tracking device further comprises a wireless transceiver configured to communicate with the beacon device, the wireless transceiver comprising one or more of the following: a Bluetooth transceiver, a Bluetooth Low Energy transceiver, a WiFi transceiver, and a near-field transceiver.

46. The tracking device of claim 33, where the instructions further cause the one or more processors to determine the initial location of the beacon device based on one or more of a Global Positioning System (GPS) signal, a Global Navigation Satellite System (GLONASS) signal, and a Baidu signal, as measured by a corresponding sensor on the tracking device.

47. An autonomous object tracking method, the method comprising:
    determining an initial location coordinate of a beacon device carried by a target object, the beacon device comprising at least an inertial measurement unit (IMU) and a wireless transceiver;
    registering the beacon device with a tracking device configured to track the target object, wherein registering comprises using the initial location coordinate of the beacon device to initialize an inertial navigation waypoint for the beacon device;
    receiving, from the beacon device, one or more first monitoring signals comprising first IMU measurements, the first IMU measurements corresponding to movements of the beacon device as carried by the target object;
    calculating one or more first estimated locations of the beacon device by using the first IMU measurements to determine a cumulative displacement from the inertial navigation waypoint of the beacon device;
    determining an updated inertial navigation waypoint for the beacon device, where the determining is based on a detected location of the target object and is triggered in response to receiving an indication that an optical analysis system of the tracking device has located the target object in one or more frames of visual data captured by a camera disposed on the tracking device, by:
        performing optical triangulation to determine a relative position of the target object with respect to the tracking device, the optical triangulation comprising:
            obtaining one or more frames of visual data captured by a camera disposed on the tracking device;
            analyzing the frames of visual data to identify a location of the target object within a given frame, wherein detection frames are the given frames in which the location of the target object is successfully identified; and
            extrapolating a three-dimensional spatial position of the target object based on one or more calculated projection vectors extending from a sensor of the camera disposed on the tracking device to the identified locations of the target object within the detection frames;
        obtaining a current location coordinate of the tracking device; and
        calculating the updated inertial navigation waypoint for the beacon device based on the current location coordinate of the tracking device and the relative position of the target object with respect to the tracking device;
    receiving, from the beacon device, one or more second monitoring signals comprising second IMU measurements; and
    calculating one or more second estimated locations of the beacon device by using the second IMU measurements to determine a second cumulative displacement from the updated inertial navigation waypoint for the beacon device.

* * * * *